United States Patent
Sato et al.

(10) Patent No.: US 6,804,822 B2
(45) Date of Patent: Oct. 12, 2004

(54) MAGNETIC RECORDING MEDIUM AND MAGNETIC RECORDING APPARATUS USING SAME

(75) Inventors: Junichi Sato, Nara (JP); Kosuke Watanabe, Yao (JP); Kunio Kojima, Nabari (JP); Hiroyuki Katayama, Nara (JP); Hiroshi Fuji, Soraku-gun (JP); Kenji Ohta, Kitakatsuragi-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 187 days.

(21) Appl. No.: 10/132,775

(22) Filed: Apr. 25, 2002

(65) Prior Publication Data

US 2002/0186506 A1 Dec. 12, 2002

(30) Foreign Application Priority Data

| Apr. 27, 2001 | (JP) | ........................................ | 2001-133567 |
| Mar. 18, 2002 | (JP) | ........................................ | 2002-075151 |

(51) Int. Cl.$^7$ ................................................ G11B 7/24
(52) U.S. Cl. ................................... 720/718; 369/13.4
(58) Field of Search ................... 360/59, 135; 369/272, 369/288, 283, 13.4; 428/141, 142, 332, 694 T, 694 TS, 694 ST, 611; 720/718

(56) References Cited

U.S. PATENT DOCUMENTS

| 5,599,605 | A | * | 2/1997 | Shono et al. | ................ | 428/141 |
| 5,650,237 | A | * | 7/1997 | Satoh et al. | ................ | 428/611 |
| 5,656,385 | A | * | 8/1997 | Nakajima et al. | ........ | 428/694 T |
| 5,738,927 | A | * | 4/1998 | Nakamura et al. | .......... | 428/141 |
| 5,952,094 | A | * | 9/1999 | Van Kesteren et al. | ..... | 428/332 |

(List continued on next page.)

FOREIGN PATENT DOCUMENTS

| JP | 61-240429 | | 10/1986 | | |
| JP | 63050940 A | * | 3/1988 | ........... | G11B/11/10 |
| JP | 63160008 A | * | 7/1988 | ........... | G11B/5/66 |
| JP | 01199314 A | * | 8/1989 | ........... | G11B/5/66 |

(List continued on next page.)

OTHER PUBLICATIONS

"Perpendicular Magnetic Recording Media Using Magneto-Optical Media " (K. Matsumoto et al., the 25$^{th}$ Applied Magnetization Association, pp. 235–a,b, Sep. 2001).

"TbFeCo as a Perpendicular Magnetic Recording Material" (K. Ozaki et al., J. MAgn. Soc. Japan. vol. 25, No. 3–2, pp. 322–327, Mar. 2001).

(List continued on next page.)

*Primary Examiner*—William Klimowicz
(74) *Attorney, Agent, or Firm*—Edwards & Angell, LLP; David G. Conlin; George W. Hartnell, III

(57) ABSTRACT

A magnetic recording medium, which includes a substrate and an amorphous magnetic layer, made of an amorphous magnetic material, for magnetic recording of data, is provided with an underlayer between the substrate and the amorphous magnetic layer, the underlayer being made of amorphous metal element, and having a mean thickness of 10 nm or less. In this manner, movement of magnetic domain walls of the amorphous magnetic layer is effectively limited by minute irregularities on a surface of the underlayer. This realizes a stable formation of a minute recording mark. This realizes recording having a sufficient signal quality, even when the high-density recording is performed by forming such a minute recording mark that a shortest length of the recording mark is less than 100 nm. Moreover, this allows the magnetic recording medium to have a simplified layer structure. Further, a magnetic recording apparatus magnetically records data onto a magnetic recording medium having the above arrangement, by heating a portion of the magnetic layer by radiating a light beam locally, and by applying a magnetic field on at least part of the portion of the magnetic layer on which the light beam is radiated. This provides a magnetic recording apparatus for high-density recording.

23 Claims, 18 Drawing Sheets

U.S. PATENT DOCUMENTS

| | | | | |
|---|---|---|---|---|
| 6,022,609 A | * | 2/2000 | Gao et al. | 428/141 |
| 6,183,892 B1 | * | 2/2001 | Saiki et al. | 428/694 ST |
| 6,277,462 B1 | * | 8/2001 | Watanabe et al. | 428/64.1 |
| 6,319,580 B1 | * | 11/2001 | Araki et al. | 428/64.1 |
| 6,423,431 B1 | * | 7/2002 | Wong et al. | 428/694 TS |
| 6,428,906 B1 | * | 8/2002 | Wong et al. | 428/611 |
| 6,613,460 B1 | * | 9/2003 | Abarra et al. | 428/694 TS |
| 2001/0033949 A1 | * | 10/2001 | Abarra et al. | 428/694 TS |
| 2001/0048568 A1 | * | 12/2001 | Ikeda et al. | 360/59 |
| 2002/0044523 A1 | * | 4/2002 | Oshima et al. | 369/272 |
| 2002/0048692 A1 | * | 4/2002 | Hosokawa et al. | 428/694 TS |
| 2003/0064251 A1 | * | 4/2003 | Uwazumi et al. | 428/694 BM |

FOREIGN PATENT DOCUMENTS

| | | | | |
|---|---|---|---|---|
| JP | 04295614 A | * | 10/1992 | G11B/5/66 |
| JP | 05-282648 | | 10/1993 | |
| JP | 07093738 A | * | 4/1995 | G11B/5/66 |
| JP | 08227516 A | * | 9/1996 | G11B/5/66 |
| JP | 09180275 A | * | 7/1997 | G11B/11/10 |
| JP | 10001327 A | * | 1/1998 | C03C/3/04 |
| JP | 10162336 A | * | 6/1998 | G11B/5/66 |
| JP | 2000030234 A | * | 1/2000 | G11B/5/66 |

OTHER PUBLICATIONS

"Effect Of Air Gap On Write And Reachout Characteristics Of Magneto–Optical Media With Solid Immersion Lens" (H. Kawano et al., Technical Digest of Joint MORIS/APDSC, pp.188–189. Oct. 2000).

H. Ito et al., "Occurrence of large perpendicular magnetic anistropy in bilayered films with nanometer–thick TbFeCo and Al layers," J. appl. Phys. 79 (8), Apr. 1996, pp.6273–6275.

* cited by examiner

F I G. 8
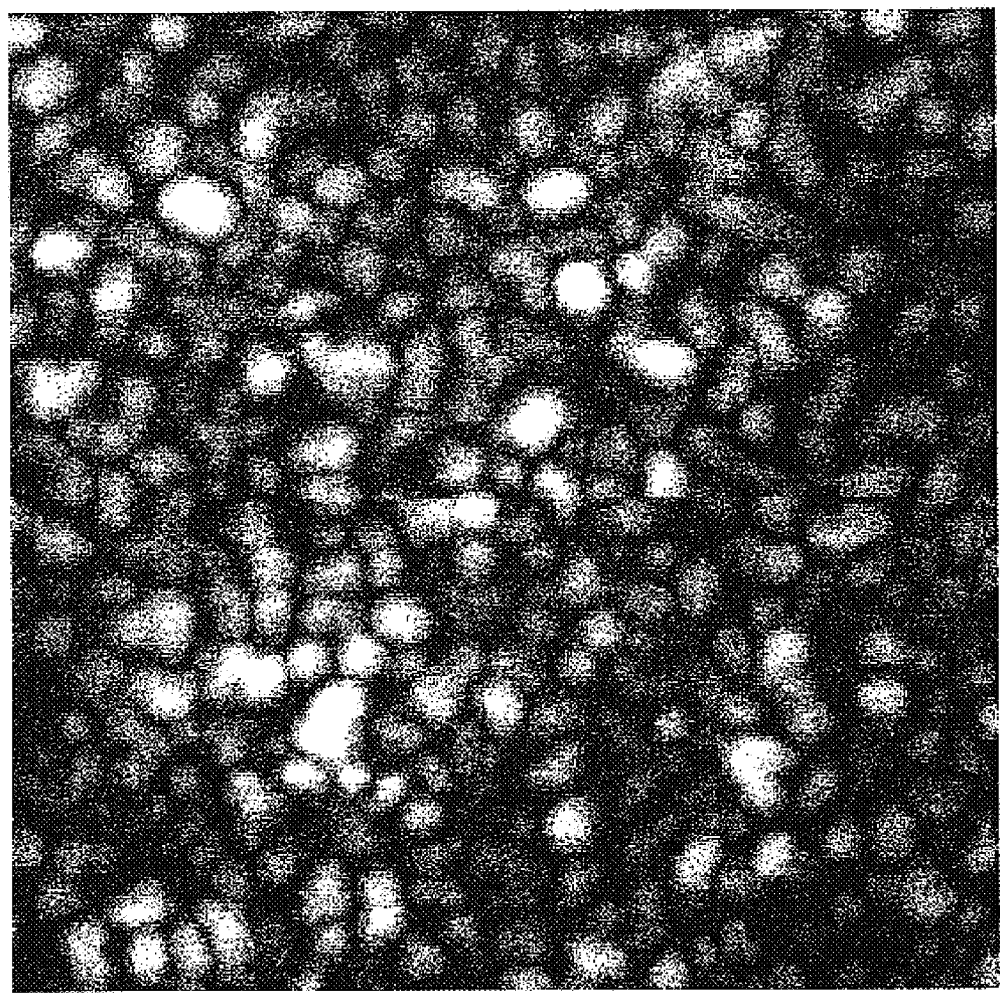
100 nm

F I G. 9
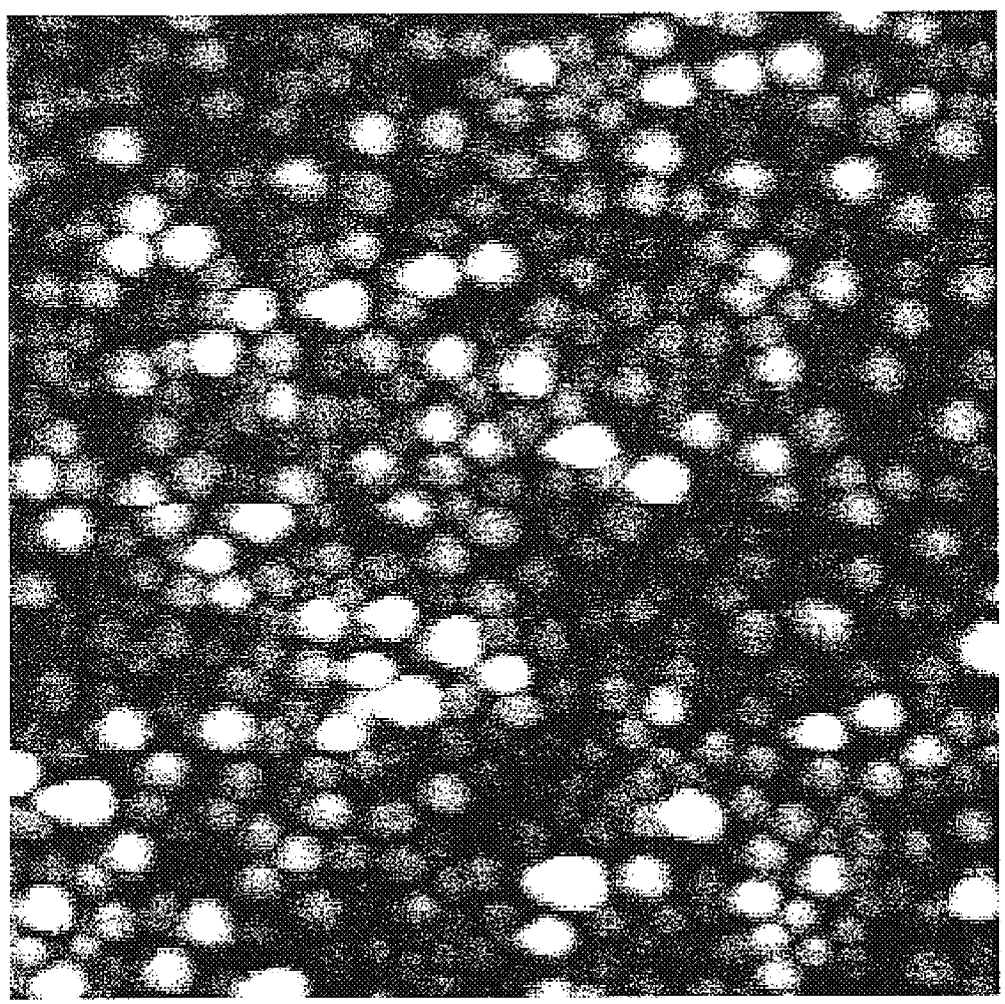
100 nm

F I G. 10
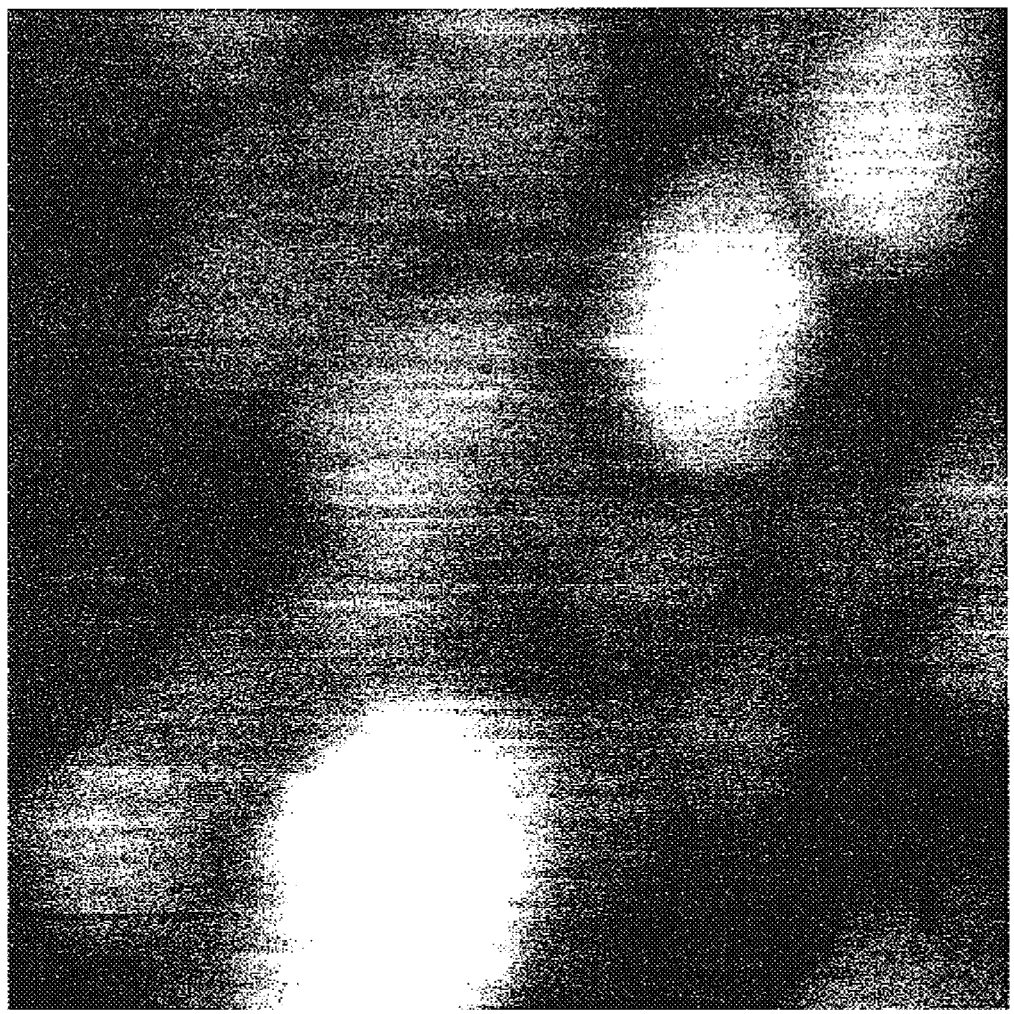
100 nm 100 nm

F I G. 1 3
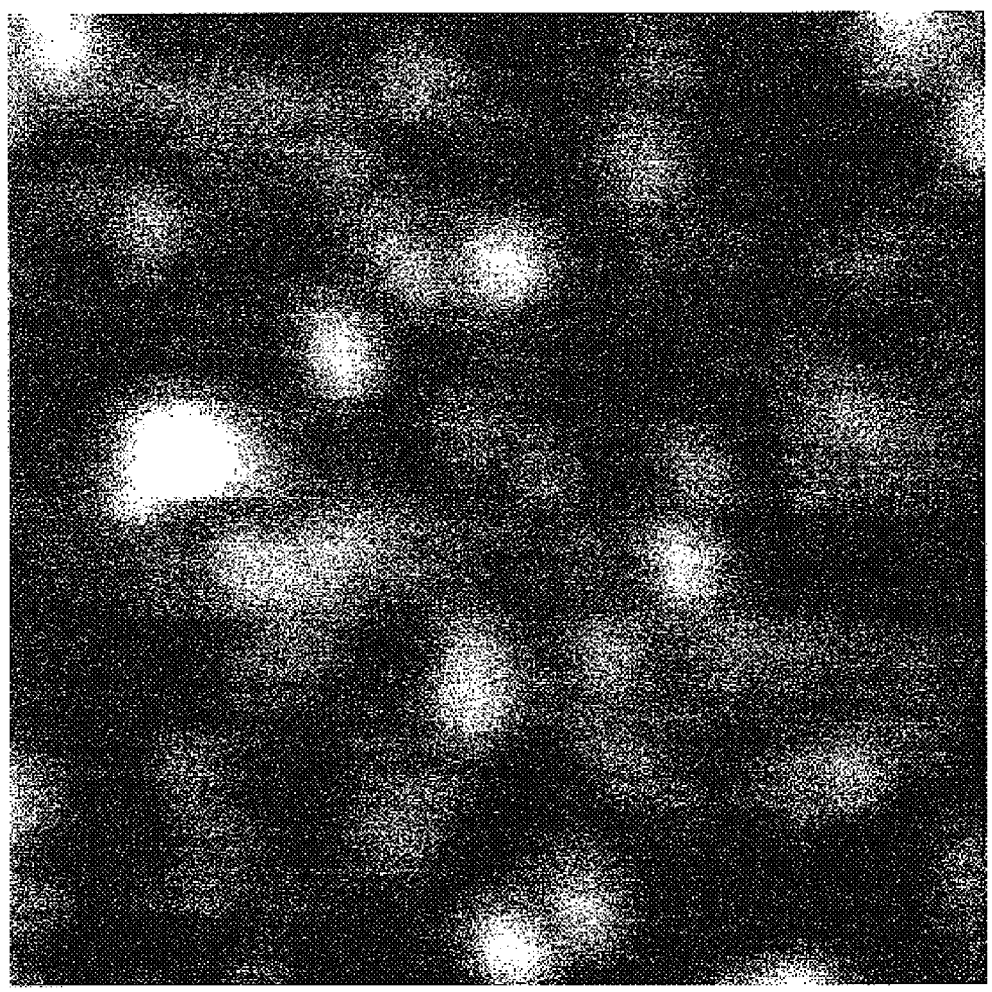
100 nm

DOWN-TRACK DIRECTION

US 6,804,822 B2

MAGNETIC RECORDING MEDIUM AND MAGNETIC RECORDING APPARATUS USING SAME

FIELD OF THE INVENTION

The present invention relates to a magnetic recording medium suitable for use in a magnetic recording apparatus for magnetic recording of data by (a) heating up (applying a heat onto) a recording region of a magnetic layer (a portion of the magnetic layer) by using a light beam (heat source) and (b) by applying a magnetic field on the recording region, and to the magnetic recording apparatus using the same.

BACKGROUND OF THE INVENTION

Recently, optical memories, such as DVDs (Digital Versatile Discs) and magneto-optical discs, and magnetic memories, such as hard discs, have been significantly improved to have high densities. Especially, an optically assisted magnetic recording/reproducing method has been developed as one of high-density magnetic recording/reproducing methods. For example, U.S. Pat. No. 5,656,385 (registered on Aug. 12, 1997: corresponding to Japanese Unexamined Patent Application (Tokukaihei) No. 4-176034) discloses (a) a magnetic recording medium having a recording layer made of an N-type ferrimagnetic material whose compensation point (magnetic compensation temperature) is substantially at room temperatures, and (b) an optically assisted magnetic recording/reproducing method (hereinafter, referred to as a first prior art) using the same.

For recording in this type of optically assisted magnetic recording/reproducing method, a laser beam heats up (laser heating) a recording region of the magnetic recording medium so as to sufficiently reduce a coercive force, then a recording magnetic head applies an exterior magnetic field on the recording region, thereby recording data. A region in which a recording mark (magnetic bit) is formed during the recording is limited within a region in which a region (laser beam radiation region) on which the laser beam is radiated overlaps a region (magnetic field applied region) on which the magnetic field is applied. Their positional relationship is explained referring to FIG. 17. A recording region 113 is a region in which a magnetic field applying region 111 formed by the magnetic head overlaps a heating region 112 (corresponding to a light spot) formed by radiating the laser beam. In the recording region 113, formed is a recording mark 114. As a result, it is possible to record, on the magnetic recording medium, a track 115 that has a narrow pitch that is equivalent to a diameter of beam spot of the laser beam (a diameter of the heating region 112; 0.5 m or less) by using a conventional recording magnetic head of a few m width.

Also for reproducing, the laser beam heats up a reproducing region of the magnetic recording medium so as to intensify residual magnetization, then data is read out of the reproducing region by a reproducing magnetic head. A region that is reproduced during the reproduction is also limited within a region where the region on which the laser beam radiation region overlaps a recording head region (where the recording magnetic head applies a magnetic field). This makes it possible to reproduce the track recorded with the narrow track pitch, by using a reproducing magnetic head having a large width, so that crosstalk will be restrained.

In this manner, the optically assisted magnetic recording/reproducing method, that is the first prior art, uses the laser beam as the heat source so as to selectively heat up a region narrower than the magnetic field applied region. This allows the recording track pitch to be narrower and reduces the crosstalk. For this reason, the recording and reproduction of the first prior art are carried out in high density.

Moreover, the optically assisted magnetic recording/reproducing method uses a magnetic recording medium in which an aluminum nitride (AlN) film of 60 nm is formed as an underlayer on a disc substrate, then a recording layer and a protective layer are formed on the AlN film in this order. The AlN underlayer is provided for preventing the light beam from reflecting and improving efficiency of the heating. In other words, the AlN underlayer is used for improving absorption rate of the light beam (a rate of light absorbed by the recording layer) that comes into the magnetic recording medium, and recording sensitivity.

On the other hand, an article in conference reports, K. OZAKI et al., "TbFeCo as a Perpendicular Magnetic Recording Material", J. Magn. Soc. Japan, 25, p322–327 (Publication Date: Mar. 15, 2001) (hereinafter, referred to as a second prior art) discloses a perpendicular magnetic recording medium including an underlayer having an uneven structure, for use in a conventional perpendicular magnetic recording method in which the recording is carried out only by using a magnetic head, without radiation of light. With the perpendicular magnetic recording medium, it is possible to prevent magnetic domain walls from moving, that is, to perform pinning (holding) of the magnetic domain walls so as not to move. This increases recording density. Note that an NiP layer is used as the underlayer having the uneven structure in the article.

Furthermore, an article in conference reports, Koji MATSUMOTO et al., k"Perpendicular magnetic recording media using Magneto-Optical media", the 25th Applied Magnetization Association, p 235 (Publication Date: Sep. 25, 2001), discloses an example in which an NiP layer is used as an underlayer having an uneven structure, as the second prior art. However, this article recited that in reality a carbon layer should be provided between the NiP underlayer and a TbFeCo magnetic layer, so that exchange bonding of TbFeCo and Ni will not occur even when Ni, the magnetic body, is precipitated out.

Moreover, an article in conference reports, H. Kawano, et al., "Effect of Air Gap on Write and Readout Characteristics of Magneto-Optical Media with Solid Immersion Lens", Technical Digest of Joint Moris/APDSC 2000, p188–189 (Publication Date: Oct. 30, 2000) (hereinafter, referred to as a third prior art), discloses a Magneto-optical recording medium in which an aluminum layer is provided between a glass substrate and a TbFeCo recording layer.

In data recording media, high-density recording is facilitated by increasing a recording frequency (a frequency of magnetic field application in case of magnetic modulation) so as to shorten a shortest length of a recording mark (that length of a recording mark that is along a track, where the recording mark is a minimum unit for data of 1 bit: the length represented by a reference sign M in FIG. 17).

However, in the optically assisted magnetic recording method recited in Tokukaihei No. 4-176034, the magnetic recording medium used has an insufficient capacity that makes it difficult to form a recording mark having the recording mark of the shortest length of 200 nm or less. This restrains improvement of the recording density in the optically assisted magnetic recording method.

This is based on a result of evaluation of recording and reproducing of the magnetic recording medium used in the publication. In the evaluation, it was observed that quality of signals was suddenly deteriorated when the shortest length of the recording mark approached to near 200 nm. Further, observation of the thus formed recording mark by an MFM (Magnetic Force Microscope) showed that a phenomenon in which individual recording marks are disturbed, for example, a phenomenon in which the recording marks overlap each other, or a phenomenon in which the recording mark is disappeared, was occurred when the shortest length of the recording mark approached to about 200 nm. As to a width of the track, it was observed that the width of the track got narrower and narrower, and finally was narrowed to cause a break-off. Therefore, in the conventional magnetic recording medium, the shortest length of the recording mark is practically 250 nm, considering a reliability of the optically assisted magnetic recording medium.

An exchange interaction force is one of factors that cause instability in shape of the recording mark as described above. As smaller the recording mark is, as a ratio of the exchange interaction force to forces applied on the recording mark becomes larger. In case the recording layer is made of the N-type ferrimagnetic material whose compensation point is substantially at room temperature, such as TbFeCo magnetic material, the exchange interaction force works to orient, in one direction, magnetization of the recording marks adjacent each other. Especially, in the optically assisted recording/reproducing method in which the recording region is heated up, the ratio of the exchange interaction force becomes larger during recording, because magnetic anisotoropy (coercive force) in the recording/reproducing region is significantly lowered during recording. It is deduced that an exchange interaction force caused by peripheral magnetization affects the magnetic walls (magnetic domain walls) to easily move, so that the recording mark cannot be formed, thereby causing the above phenomena. In order to stably form the recording mark in which the shortest length of the recording mark is less than 200 nm, it is necessary to have means to prevent the magnetic domain walls from moving, such as use of constraining sites (pinning sites) for stopping the magnetic domain walls from moving.

Moreover, the second prior art, which needs, in reality, three layers between the substrate and the recording layer, uses the Phosphor Nickel (NiP) layer as the underlayer for realizing the high-density recording. There is a possibility that the NiP layer may be stripped off while a spatter film is formed or with the passage of time, even though an amount of the NiP layer stripped is very small, thereby precipitating Ni, which is an component element of the NiP layer. Because Ni is also a ferromagnetic material (soft magnetic material), it is necessary to provide a carbon protective layer between the underlayer and the recording layer lest the precipitated Ni and the recording layer (magnetic layer) be bound by exchanging bonding even if this is the case. Moreover, when the laser heating is carried out for the optically assisted recording/reproducing, the stripping-off of the NiP layer is accelerated. As a result Ni is precipitated at a random location in the recording/reproducing region, and is converted into the soft magnetic material. Furthermore, this conversion is irreversible, and is not in conformity with a location and a shape of the magnetic bit in-the recording layer. For this reason, it is believed that the conversion is a factor to cause noises in reproduction signal. Moreover, it is necessary to provide a nitriding silicone layer between the underlayer and the substrate. This results in a complicated layer structure. Thus, an increase in a number of layers leads to an increase in a number of manufacturing processes, thereby hindering mass production of the magnetic recording medium. Moreover, in the second prior art, the underlayer made of Phosphor Nickel (NiP) is converted into the soft magnetic material during the heating by the laser beam. This causes a problem that the conversion affects magnetic signals of the recording layer.

Moreover, in the third prior art, the aluminum layer is sandwiched between the nitriding silicone layers so that the aluminum layer does not touch (is not put together with) the TbFeCo recording layer and is utilized as a reflection layer. For this reason, the aluminum layer has such a thick thickness of 40 nm. Moreover, unevenness in the aluminum layer deteriorates the function of the aluminum layer as the reflecting layer, thereby lowering reflection efficiency. Therefore, flatness of the aluminum layer is necessary for obtaining a sufficient reflection efficiency when the aluminum layer is utilized as the reflecting layer. For this reason, it is impossible to sufficiently prevent the magnetic domain walls of the TbFeCo recording layer from moving.

SUMMARY OF THE INVENTION

In view of the conventional problems, the present invention has an object of providing a magnetic recording medium with which high-density recording can be performed in a sufficient signal quality, and which can have a simplified layer structure, and of providing a magnetic recording apparatus using the same.

A magnetic recording medium of the present invention, in order to attain the object, is provided with (1) a substrate, and a magnetic layer, made of an amorphous magnetic material, for magnetic recording of data, or (2) a substrate, and a magnetic layer for magnetic recording of data by applying heat and a magnetic field, the magnetic recording medium further including an underlayer provided between the substrate and the magnetic layer, and the underlayer being made of a non-magnetic metal element, and being put together with the magnetic layer.

With the above arrangements, where the underlayer is made of a non-magnetic metal element, the magnetic recording layer of the present invention can have, on a surface of a layer that touches the magnetic layer, irregularities having a size (diameter of bumps) so minute, thereby limiting movement of magnetic domain walls of the magnetic layer within a shorter range (distance) (preventing the magnetic domain walls from moving more than the shorter range), compared with a conventional optically assisted magnetic recording medium. Moreover, the movement of the magnetic domain walls can be efficiently prevented, compared with the third prior art, because the underlayer is put together with the magnetic layer. As a result, the above arrangements allow a minute recording mark to be formed stably, and realizes high-density recording in a sufficient signal quality. In addition, in case where the magnetic layer is made of an amorphous magnetic material or in case the magnetic layer magnetically stores data by application of heat and a magnetic field, there is a greater tendency toward the movement of the magnetic domain walls. Thus, the above effect is distinctly exerted in those cases.

Furthermore, the above arrangements, in which the underlayer is made of a non-magnetic metal element, does not need a protective layer nor a binding layer. Because of this, the above arrangement can have a more simplified layer structure, compared with the second prior art.

Therefore, the high-density recording can be performed in a sufficient signal quality. Further, it is possible to provide a magnetic recording medium which can have a simplified layer structure.

A magnetic recording medium of the present invention, in order to attain the object, is provided with (1) a substrate, and a magnetic layer, made of an amorphous magnetic material, for magnetic recording of data, or (2) a substrate, and a magnetic layer for magnetic recording of data by applying heat and a magnetic field, the magnetic recording medium further including an underlayer provided between the substrate and the magnetic layer, the underlayer being made of a non-magnetic metal element, and having a mean thickness of 10 nm or less.

With the above arrangements, where the underlayer is made of a non-magnetic metal element, and has the mean thickness of 10 nm or less, the magnetic recording layer of the present invention can have, on a surface of a layer that touches the magnetic layer, irregularities having a size (diameter of bumps) so minute, compared with the conventional optically assisted magnetic recording medium and the third prior art. For this reason, compared with the conventional optically assisted magnetic recording medium and the third prior art, it is possible to limit the movement of magnetic domain walls of the magnetic layer within a shorter range, thereby realizing a stable formation of a minute recording mark. As a result, the above arrangements realize high-density recording in a sufficient signal quality. In addition, in case where the magnetic layer is made of an amorphous magnetic material or in case the magnetic layer magnetically stores data by application of heat and a magnetic field, there is a greater tendency toward the movement of the magnetic domain walls. Thus, the above effect is distinctly exerted in those cases.

Furthermore, the above arrangements, in which the underlayer is made of a non-magnetic metal element, does not need a protective layer nor a binding layer. Because of this, the above arrangements can have a more simplified layer structure, compared with the second prior art.

Therefore, it is possible to provide a magnetic recording medium with which high-density recording is carried out with a sufficient quality, and whose layer structure can be simplified.

In order to attain the above object, a magnetic recording medium of the present invention is provided with (a) a substrate and (b) a magnetic layer for magnetic recording of data, the magnetic recording medium further including an underlayer provided between the substrate and the magnetic layer, the underlayer being made of a non-magnetic metal element, and having an irregular surface that faces to the magnetic layer, the irregular surface having bumps of a diameter of less than 100 nm.

With the above arrangement, the magnetic recording layer of the present invention can have, on a surface of a layer that touches the magnetic layer, irregularities having a size (diameter of bumps) so minute, compared with the conventional optically assisted magnetic recording medium and the third prior art. For this reason, compared with the conventional optically assisted magnetic recording medium and the third prior art, it is possible to limit the movement of magnetic domain walls of the magnetic layer within a shorter range, thereby realizing a stable formation of a minute recording mark. As a result, the above arrangement realizes high-density recording in a sufficient signal quality.

Furthermore, the above arrangement, in which the underlayer is made of a non-magnetic metal element, does not need a protective layer nor a binding layer. Because of this, the above arrangement can have a more simplified layer structure, compared with the second prior art.

Therefore, the high-density recording can be performed in a sufficient signal quality. Further, it is possible to provide a magnetic recording medium which can have a simplified layer structure.

Note that in the specification of the present application, the terms "diameter of bumps" mean how much is the diameter of the bumps that are higher sections with respect to a level of a bottom surface of the non-bumps. Moreover, in the specification of the present application, the wording the "bumps of a diameter of less than 100 nm" means that a mean value of the diameter of the bumps is less than 100 nm.

In order to attain the above object, a magnetic recording apparatus of the present invention for magnetically recording data onto any one of the magnetic recording media, the magnetic recording apparatus magnetically recording data onto the magnetic layer, and including magnetic field applying means for applying a magnetic field on the magnetic layer, the magnetic field orientating magnetization of the magnetic layer.

The above arrangement can provide a magnetic recording apparatus that can perform high-density recording in a sufficient signal quality because the magnetic recording medium having the above described feature is used.

In order to attain the above object, a magnetic recording apparatus of the present invention for magnetically recording data onto any one of the magnetic recording media, the magnetic recording apparatus magnetically recording data onto the magnetic layer, and including (a) light beam radiating means for radiating a light beam locally onto a portion of the magnetic layer, the light beam locally heating the magnetic layer, and (b) magnetic field applying means for applying a magnetic field on at least part of the portion of the magnetic layer on which the light beam is radiated, the magnetic field orientating magnetization of the magnetic layer.

The above arrangement can provide a magnetic recording apparatus that can perform high-density recording in a sufficient signal quality because the magnetic recording medium having the above described feature is used. Moreover, with the above arrangement, where the optically assisted magnetic recording method is applied, a region in which the recording is performed is limited within an area (region) in which a light beam radiating region overlap a magnetic field applying region. This narrows a recording track width, thereby realizing high-density recording. Furthermore, there is a greater tendency toward the movement of the magnetic domain walls in the optically assisted magnetic recording method. Thus, the above effect is distinctly exerted in those cases.

For a fuller understanding of the nature and advantages of the invention, reference should be made to the ensuing detailed description taken in conjunction with the accompanying drawings.

BRIEF DESCRIPTION OF THE DRAWINGS

FIG. 8 is a view showing microscopic observation in which the surface of the underlayer of the magnetic recording medium of the embodiment of the present invention was observed in a normal direction by using an atomic force microscope.

FIG. 9 is a view showing microscopic observation in which a surface of an underlayer of a magnetic recording medium of another embodiment of the present invention was observed in a normal direction by using an atomic force microscope.

FIG. 10 is a view showing microscopic observation in which a surface of a glass-disc substrate was observed in a normal direction by using an atomic force microscope.

FIG. 13 is a view showing microscopic observation in which a surface of an amorphous magnetic layer of the comparative magnetic recording medium of was observed in a normal direction by using an atomic force microscope.

DESCRIPTION OF THE EMBODIMENTS

Described below is an embodiment of the present invention, referring to FIGS. 1, 2, and 17.

Figure 1:
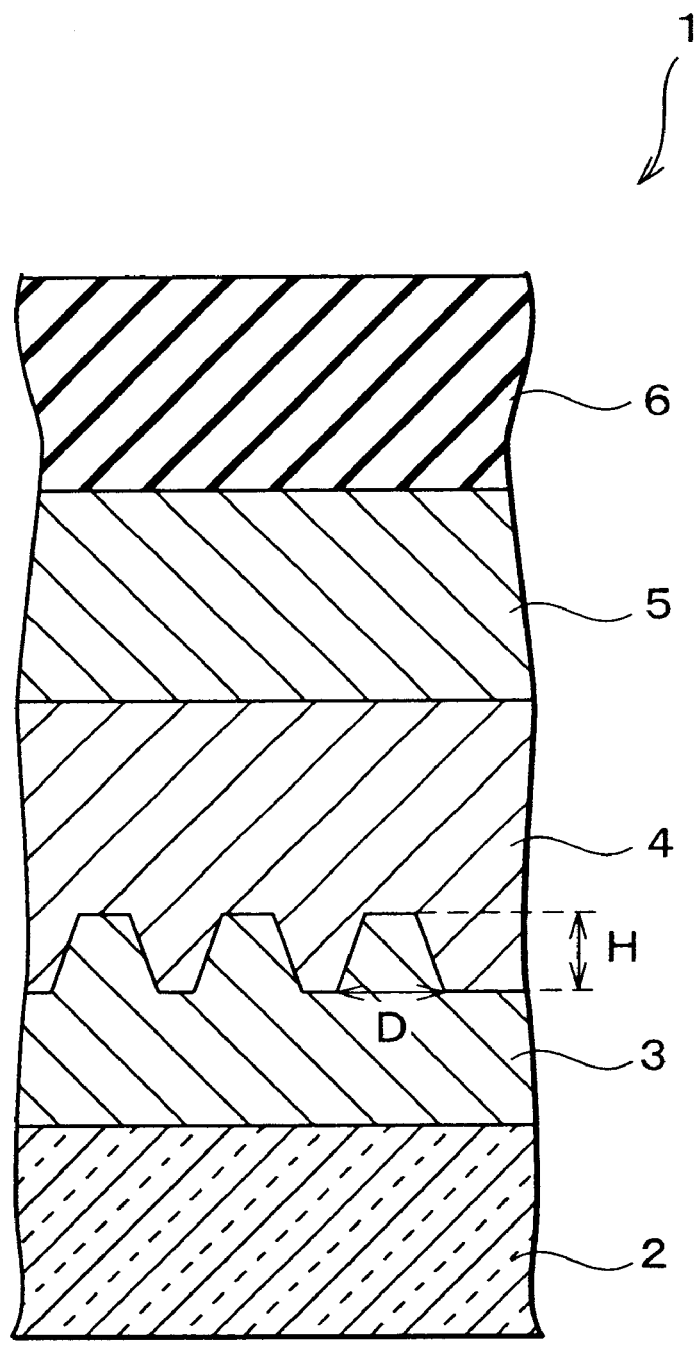
FIG. 1 is a cross-sectional view showing a magnetic recording medium of an embodiment of the present invention.

A magnetic recording medium 1 of the present embodiment, as shown in FIG. 1, is a magnetic recording medium for use in an optically assisted magnetic recording/reproducing method in which data is magnetically recorded or reproduced on/from a recording region by heating by means of a laser beam.

The magnetic recording medium 1 is produced by forming, on a substrate 2, an underlayer 3 made of a non-magnetic metallic element, an amorphous magnetic layer (magnetic layer) 4 made of an amorphous magnetic material, a protective layer 5, and a lubricating layer 6, in this order. Moreover, irregularities (bumps and non-bumps) are formed on a surface of the underlayer 3. On the surface having those irregularities, the amorphous magnetic layer 4 is formed.

The substrate 2 may be any type of substrate, provided that the substrate is strong enough to maintain the amorphous magnetic layer 4 without deforming the amorphous magnetic layer 4, and has a substantially flat surface on a side thereof to face the amorphous magnetic layer 4. For example, a glass substrate, an aluminum (Al) substrate, a plastic substrate, a silicone substrate, and the like may be used as the substrate 2. However, the glass substrate is especially suitable for the substrate 2. It is preferable the substrate 2 has an average roughness (Ra) of less than 1 nm in order that the underlayer 3 has a surface that is evenly irregular sufficiently. Moreover, it is preferable that the surface of the substrate 2 is cleaned by the reverse sputtering (cathode sputtering), or the like method.

Regarding sizes of the irregularities on the surface of the underlayer 3, it is preferable that bumps of the irregularities have a diameter D of less than 100 nm. Bumps having a diameter D of less than 50 nm is more preferable, and bumps having a diameter ranging from 10 nm to 50 nm is further more preferable. Moreover, it is preferable that the bumps on the surface of the underlayer 3 have the diameter D basically smaller than a shortest length of a recording mark (that length of the recording mark is along a track direction, where the recording mark is a minimum unit for data of 1 bit), which is formed on the amorphous magnetic layer 4. Therefore, for example in case the shortest length of the recording mark is 50 nm, it is desirable that the diameter D of the bumps is less than 50 nm. Moreover, it is more preferable that the diameter D of the bumps on the surface of the underlayer 3 is smaller, for the sake of stable formation of a smaller recording mark on the amorphous magnetic layer 4.

Moreover, regarding the size of the irregularities on the surface of the underlayer 3, it is preferable that the bumps on the surface of the underlayer 3 have a height H that is at least higher than a height of bumps of irregularities (waviness) on the surface of the substrate 2, lest the bumps on the surface of the underlayer 3 be hidden among the irregularities (waviness) on the surface of the substrate 2. Considering that a substrate 2 that is generally used at present has bumps of approximately 3 nm on its surface, it is preferable that the height H of the bumps on the surface of the underlayer 3 is 3 nm or more. Moreover, it is desirable that the bumps on the surface of the underlayer 3 has a greater height H, in order to prevent magnetic domain walls from moving beyond the bumps.

Moreover, the height H of the bumps on the surface of the underlayer 3 can be greater by having a greater mean thickness of the underlayer 3. The greater mean thickness of the underlayer 3 leads to a greater diameter D of the bumps on the surface of the underlayer 3. For this reason, the diameter D of the bumps of the irregularities to be formed on the surface of the underlayer 3 determines an upper limit of the height H of the bumps on the surface of the underlayer 3. For example, in case an aluminum layer having irregularities whose bumps has a diameter D of 50 nm or less is to be formed as the underlayer 3, the upper limit of the height H of the bumps on the surface of the underlayer 3 will be around 10 nm. Moreover, it is desirable that the irregularities on the surface of the underlayer 3 are formed with sufficiently high density. In the specification of the present application, it should be noted that the terms "the height of the bumps" indicate how high is the bumps that are higher sections with respect to a level of a bottom surface of the non-bumps.

It is preferable that the non-magnetic metallic element that composes the underlayer 3 is a non-magnetic metallic element that allows the underlayer 3 to have such irregularities that the bumps have a diameter D of less than 10 nm. Examples of such non-magnetic metallic elements include aluminum (Al), silver (Ag), gold (Au), and the like, but especially aluminum (Al) is preferred. Moreover, an alloy having at least one of those metallic elements as its main component may be used for the non-magnetic metallic element.

The irregularities on the surface of the underlayer 3 may be formed by utilizing a phenomenon that particulate such as crystal particles and the amorphous particles are formed on a surface of the material (non-magnetic metallic element) when forming a layer of the material by a self-formation method in which the formation of the material is spontaneously performed. Specifically, suitable for a method of forming the irregularities on the surface of the underlayer 3 are: a method in which a polycrystal non-magnetic metallic element layer or a polycrystal non-magnetic alloy layer is deposited on the substrate 2, then crystal particulate is formed on a surface of the polycrystal non-magnetic metallic element layer or the polycrystal non-magnetic alloy layer; and a method in which a non-crystal non-magnetic metallic element layer or a non-crystal non-magnetic alloy layer is deposited on the substrate 2, then amorphous particulate is formed on a surface of the non-crystal non-magnetic metallic element layer or the non-crystal non-magnetic alloy layer.

It is possible to control the diameter D and the height H of the bumps of the irregularities on the surface of the underlayer 3, mainly by controlling the mean thickness of the underlayer 3. In case the underlayer 3 is formed by the self-formation method, the diameter D of the bumps of the irregularities on the surface of the underlayer 3 depends on the mean thickness of the underlayer 3. Thus, the diameter D is smaller as the mean thickness of the underlayer 3 is thinner. For this reason, it is preferable that the mean thickness of the underlayer 3 is so set that the diameter D of the bumps will satisfy the preferable numerical ranges described above. For example, in case an aluminum film is formed as the underlayer 3 on the substrate 2 by the direct current (DC) magnetron sputtering method as later described in an example, minute irregularities in which the bumps whose diameter D of 100 nm or less are formed in high density on the underlayer 3, when the aluminum file has a mean thickness of 10 nm or less. Moreover, in case the aluminum film is formed as the underlayer 3 on the substrate 2 by the direct current (DC) magnetron sputtering method, and the aluminum film has a mean thickness of 6 nm or less, minute irregularities in which the bumps whose diameter D of 50 nm or less are formed in high density on the underlayer 3. In view of this, it is preferable that the underlayer 3 has a mean thickness of 10 nm or less, and it is more preferable that the underlayer 3 has a mean thickness of 6 nm or less.

Moreover, in case the underlayer 3 is formed simply by the self-formation method, the diameter D and the height H of the bumps of the irregularities on the surface of the underlayer 3 are substantially direct-proportional to the mean thickness. The mean thickness of the underlayer 3 should be in a range from 2 nm to 6 nm in order to satisfy a relationship that the bumps of the irregularities on the surface of the underlayer 3 have a diameter D of 50 nm or less and a height H of 3 nm or more. In this way, the bumps on the irregularities on the surface of the underlayer 3 has a diameter D ranging from 10 nm to 50 nm, and a height H ranging from 3 nm to 10 nm, thereby satisfying the relationship. In other words, when the underlayer 3 had a mean thickness of 2 nm to 6 nm, it is possible to form minute irregularities that are not so small to be hidden among the irregularities of the substrate 2, and that limit the movement of the magnetic domain walls within a sufficiently short range (prevent the magnetic domain walls from moving more than the sufficiently short range). Therefore, it is possible to form minute recording mark on the amorphous magnetic layer 4, stably.

It should be noted that, in the specification of the present application, the terms "mean thickness" mean a thickness of a film (layer) that is indirectly measured in the following manner: To begin with, a film of the same raw material as the film to be measured is formed under the conditions in which the film to be measured is formed, so as to have a thickness thick enough to ignore irregularities on a surface thereof with respect to the thickness. The thus obtained film is a sample to be measured. Next, the thickness of the sample is measured. Speed of film formation (thickness of film formed per time) is worked out from the thickness of the sample measured and a period of time taken to form the film of sample. Then, based on the speed of film formation, a thickness (mean thickness) of the film (layer) to be measured is worked out from a period of time taken to form the film to be measured. It is also possible to consider the mean thickness to be a thickness worked out by converting a weight of the film into the thickness in accordance with its density (weight by volume).

The amorphous magnetic material composing the amorphous magnetic layer 4 may be any magnetic material, provided that the magnetic material allows the optically assisted magnetic recording, in short, is a ferrimagnetic material whose compensation temperature is around room temperatures. However, the amorphous magnetic material of the amorphous magnetic layer 4 is especially preferably an amorphous rare earth-transition metal alloy. Examples of amorphous rare earth-transition metal alloys include TbFe, GdFe, DyFeCo, TbFeCo. However, TbFeCo is especially preferable. It should be noted that, in the specification of the present application, the term "alloy" such as "TbFe" does not mean an alloy of a particular composition, but an alloy having an arbitrary composition.

The protective layer 5 has a function of protecting the amorphous magnetic layer 4 from being damaged when the magnetic recording medium 1 is touched by magnetic head. There is no limit as to which material the protective layer 5 is made of. However, a carbon type of protective layer such as a carbon layer and a carbon nitride layer, is suitable for the protective layer 5. Especially, the carbon layer is suitable for the protective layer 5.

The lubricating layer 6 reduces friction that is caused when the magnetic recording medium 1 is touched by the magnetic head. As the lubricating layer 6, a fluid type lubricating agent, especially, a perfluoro polyoxyalkane (perfluoro polyether) type lubricating agent is suitably used.

As discussed above, a magnetic recording medium 1 of the present embodiment is provided with an underlayer 3 on a substrate 2, and, on the underlayer 3, an amorphous magnetic layer 4 for magnetic recording of data by applying heat and a magnetic field, wherein the underlayer 3 is made of a non-magnetic metal element and has an irregular surface (has irregularities on its surface) that is put together with the amorphous magnetic layer 4.

In the above arrangement, the irregularities on the surface of the underlayer 3 function as constraining sections (pinning sites), which prevents the movement of the magnetic domain walls of the amorphous magnetic layer 4. In the above arrangement, where the underlayer 3 is made of a non-magnetic metal element, the irregularities on the surface of the underlayer 3 are irregularities having a minute size (the diameter D of the bumps) due to the crystal particles or amorphous particles of the non-magnetic metal element. Thus, the size (diameter D of the bumps) of the irregularities on the surface of the underlayer 3 is more minute than that of irregularities on a surface of an underlayer 3 made of aluminum nitride, which is used in a conventional optically assisted magnetic recording medium. Because of this, it is possible to limit the movement of the magnetic domain walls of the amorphous magnetic layer 4 within a shorter range, compared with the conventional optically assisted magnetic recording medium. Moreover, with the above arrangement, where the underlayer 3 made of a non-magnetic metal element is so provided as to be put together with the amorphous magnetic layer 4, it is possible to efficiently limit the movement of the magnetic domain walls of the amorphous magnetic layer 4 within a shorter range, compared with the third prior art, in which an aluminum layer is provided with respect to a substrate side of a magnetic layer (a side of the magnetic layer that faces to the substrate), sandwiching a nitriding silicone layer in-between. Because of those, with the above arrangement, a minute recording mark is stably formed. As a result, a sufficient signal quality is obtained even when the high-density recording is performed by a recording mark so minute that its shortest length of the recording mark is 100 nm or less.

Especially, in the optically assisted recording/reproducing method, when recording and when reproducing, a recording mark targeted is heated, so that magnetic anisotropy will be significantly reduced while a coercive force is dropped. For this reason, it is important to limit the movement of the magnetic domain walls of the amorphous magnetic layer 4 within a shorter range. Thus, an effect of the underlayer 3 to limit the movement of the magnetic domain walls of the amorphous magnetic layer 4 become more distinct.

Moreover, the above arrangement, in which the underlayer 3 is made of a non-magnetic metal element, needs no carbon protective layer between the underlayer 3 and the amorphous magnetic layer 4, and need no nitriding silicon layer (binding layer) between the underlayer 3 and the substrate 2. Therefore, only one layer exists between the substrate 2 and the amorphous magnetic layer 4 in the above arrangement. This makes it possible to provide a magnetic recording medium that has a fewer layer than the second prior art so that the magnetic recording medium can be easily mass-produced.

Moreover, if the underlayer 3 is made of a Nickel Phosphorus (NiP) as the second prior art, such a problem is caused that the underlayer 3 is converted into a soft magnetic material when being heated up by the laser beam, thus affecting a magnetic signal of the recording layer. Moreover, the conversion into the soft magnetic material is irreversible, and is random as to a location where the soft magnetic material is formed. Therefore, there is such a problem that the conversion into the soft magnetic material causes noises in the magnetic signal when reproducing. On the other hand, the above arrangement is free from those problems because the underlayer 3 is made of a non-magnetic material.

Moreover, as described above, it is preferable for the magnetic recording medium 1 of the present embodiment that the underlayer 3 had a mean thickness of 10 nm or less.

With the above arrangement, where the underlayer 3 had the mean thickness of 10 nm or less, it is possible to form, on the surface of the underlayer 3, irregularities including bumps having a more minute diameter, compared with the third prior art having an aluminum layer of 40 nm thickness. Therefore, the above arrangement can limit the movement of the magnetic domain walls of the amorphous magnetic layer 4 within a shorter range, thereby realizing stable formation of the minute recording mark. As a result, it is possible to improve signal quality in such a high-density recording that its shortest length of recording mark is 100 nm or less.

Note that the magnetic recording medium 1 for the optically assisted magnetic recording in which the underlayer 3 has the mean thickness of 10 nm or less is discussed above. However, the magnetic recording medium 1 in which the underlayer 3 has the mean thickness of 10 nm or less is effective as a magnetic recording medium for another type of magnetic recording, for example, as a magnetic recording medium for magnetic recording only by applying the magnetic field.

Moreover, as described above, it is preferable for the magnetic recording medium 1 of the present embodiment that the underlayer 3 has an irregular surface that faces to the amorphous magnetic layer 4, the irregular surface having bumps having a diameter D of less than 100 nm.

With the above arrangement, where the underlayer 3 has the irregular surface that faces to the amorphous magnetic layer 4, the irregular surface having bumps having the diameter D of less than 100 nm, it is possible to limit the movement of the magnetic domain walls of the amorphous magnetic layer 4 within a shorter range, thereby realizing stable formation of the minute recording mark, compared with the case where the aluminum nitride layer, having the diameter D of bumps of 100 nm or more, is used as the underlayer. As a result, it is possible to have a sufficient signal quality even when high-density recording performed by forming the minute recording mark having a shortest length of recording mark of 100 nm or less.

Note that the magnetic recording medium 1 is discussed as a magnetic recording medium for the optically assisted magnetic recording. However, the magnetic recording medium 1 can be used a magnetic recording medium for another type of magnetic recording, for example, as a magnetic recording medium for magnetic recording only by applying the magnetic field.

Moreover, the amorphous magnetic layer 4 is used as a magnetic layer for the optically assisted magnetic recording, here. A magnetic layer having a Pt/Co multilayer structure (a layer structure having a Pt layer and a Co layer) for thermal magnetic recording may be used, instead of the amorphous magnetic layer 4. However, in this case, a number of layers is significantly increased. Thus, the amorphous magnetic layer 4 made of TbFeCo and the like.

Furthermore, here, the magnetic recording medium for the optically assisted magnetic recording having the amorphous magnetic layer 4 is explained. However, here, it is possible to improve the signal quality during the high density recording by providing the underlayer 3, made of a non-magnetic metal element, having, on its surface, the irregularities in which the diameter D of the bumps is less than 100 nm, so as to position the underlayer 3 between the substrate 2 and the magnetic layer (preferably being put together with the magnetic layer).

Next, an embodiment of a magnetic recording/reproducing apparatus (magnetic recording apparatus) using the magnetic recording medium is explained.

Figure 2:
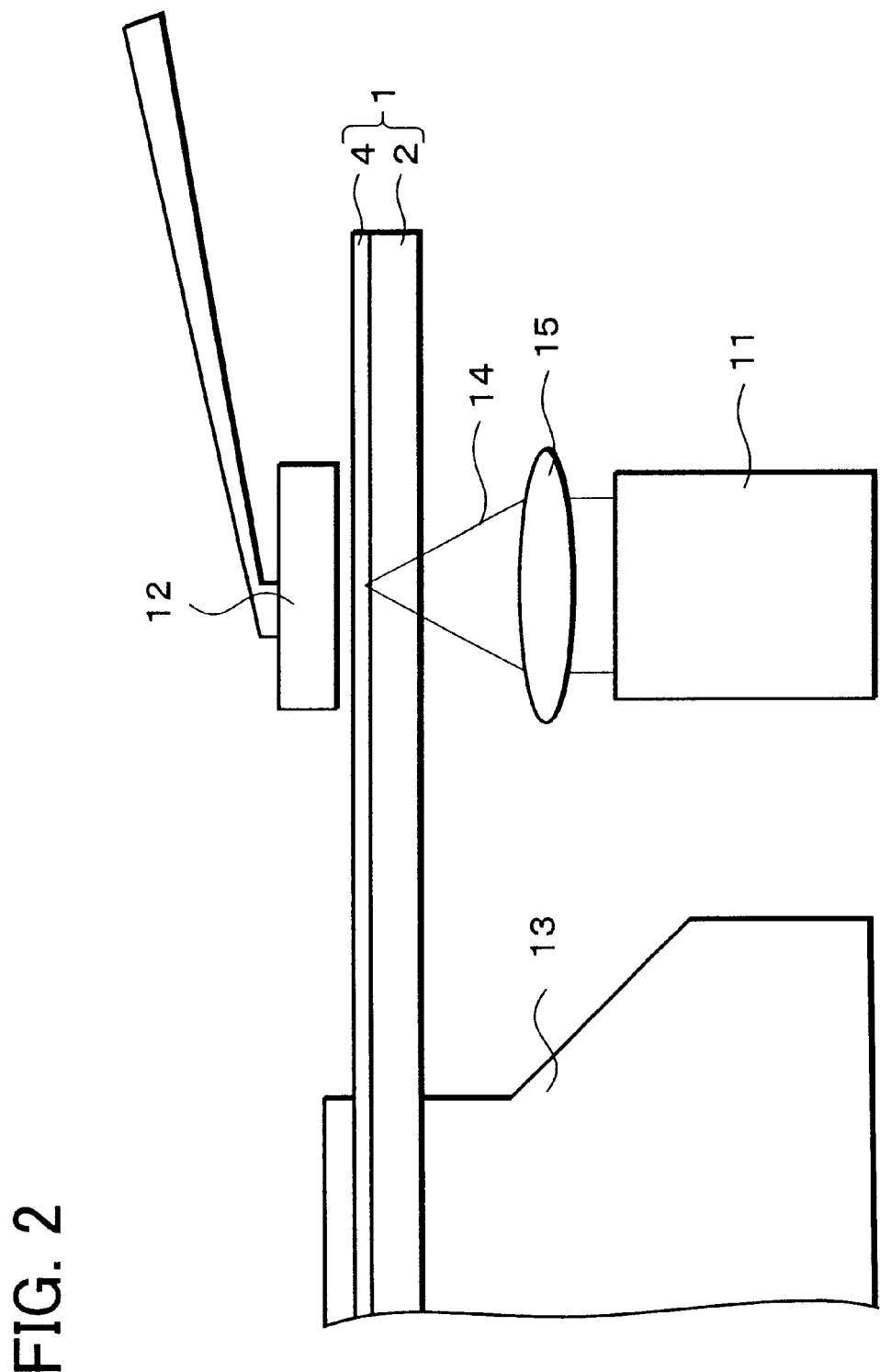
FIG. 2 is a cross-sectional view showing a magnetic recording apparatus of the embodiment of the present invention.

As shown in FIG. 2, a magnetic recording/reproducing apparatus of the present embodiment is provided with a laser pickup (light radiating means) 11 for performing the optical assist, a magnetic head (magnetic field applying means) 12, a spindle (main body) 13 for rotating the magnetic recording medium 1, and an object lens 15.

The laser pickup 11 is provided with a laser beam source (not shown). The laser beam source radiates a light beam (laser beam) 14 on the amorphous magnetic layer 4 via the underlayer 3, radiating from a substrate 2 side of the magnetic recording medium 1 (a side of the magnetic recording medium 1 on which the substrate 2 exists). The object lens 15 focuses the light beam 14 of the laser beam source, onto the amorphous magnetic layer 4.

The magnetic head 12 is located opposite to the laser pickup 11, with respect to the magnetic recording medium 1. The magnetic head 12 applies a magnetic field, which determines a direction of (orients) magnetization in the amorphous magnetic layer 4, on at least part of that region (portion) on the amorphous magnetic layer 4 in which the light beam 14 is radiated.

Next, discussed is a magnetic recording method of the magnetic recording medium 1 in application of the optical assist by using the magnetic recording/reproducing apparatus. In this method, the recording is carried out by the magnetic modulation method. However, the present invention is not limited to this. The magnetic recording medium 1 can be recorded in the optical modulation method, as well.

To begin with, the laser pickup 11 and the magnetic head 12 are positioned so as to overlap a light beam radiating region and a magnetic field applying region. Then, the magnetization of the amorphous magnetic layer 4 is oriented by direction current erasion (DE erasion). In short, initialization of the magnetization of the amorphous magnetic layer 4 is carried out.

Next, the magnetic head 12 applies a magnetic field and at the same time the light beam 14 is radiated so as to heat up. Thereby, the magnetization is oriented in each region in the amorphous magnetic layer 4, in accordance with data to be recorded.

In other words, the light beam 14 radiated from the laser beam source in the laser pickup 11 is focused on a desired recording region on the amorphous magnetic layer 4 in the magnetic recording medium 1, as shown in FIG. 2, so as to heat up the recording region on which the light beam 14 is radiated, to a temperature at which a coercive force of the recording region becomes sufficiently small (about 1 kOe). Then, a signal magnetic field in which data to be recorded is modulated is applied into the magnetic head 12 so as to perform recording on the recording region. When doing this, the recording is carried out only in a part where the coercive force is so lowered to be 1 kOe, substantially. Next, the radiation of the light beam 14 is stopped, so that the temperature will be dropped in the recording region, so as to end the recording.

Figure 17:
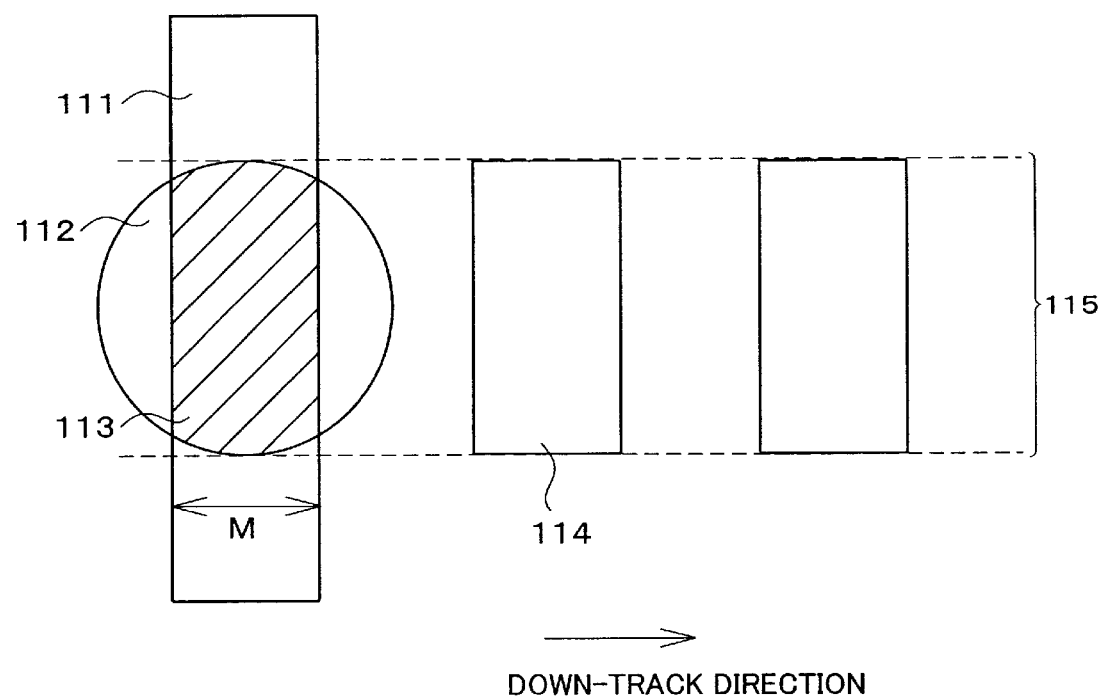
FIG. 17 is an explanatory view for explaining formation of a recording mark in an optically assisted magnetic recording method.
Figure 18:
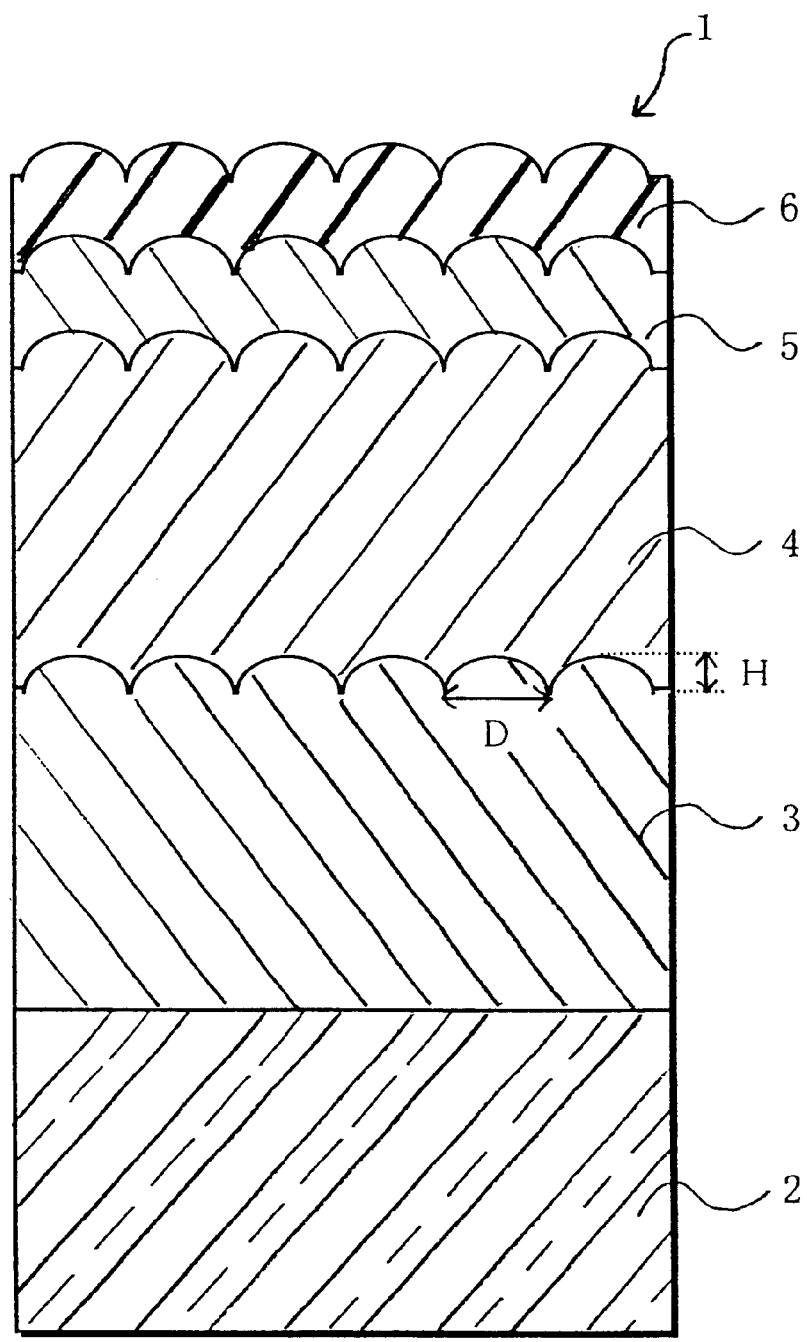
FIG. 18 is a cross-sectional view of a magnetic recording medium of an embodiment of the present invention.

In this manner, as shown in FIG. 17, caused to be the recording region 113 is the area (region) where the magnetic field applying region 111 produced by the magnetic head 12 overlaps the heating region (corresponding to the light spot) 112 generated by the laser beam radiation. The recording mark 114 is formed in the recording region 113.

Note that, in the optically assisted magnetic recording method, where the light beam (laser beam) 14 is radiated onto the amorphous magnetic layer 4 through the underlayer 3 from the substrate 2 side of the magnetic recording medium 1, it is preferable that the underlayer 3 is so thin as to be so permeable for the laser light that a sufficient amount of the laser light is passed through. Specifically, it is preferable that the underlayer 3 has the thickness of 100 nm or less, and it is more preferable that the underlayer 3 has the thickness of 10 nm or less. In addition, in case the light beam 14 is directed into the magnetic recording medium 1 from a lubricating layer 6 side (a side of the magnetic recording medium 1 on which the lubricating layer 6 exists) of the magnetic recording medium 1 of the FIG. 1, the laser light is not shut off, even if the underlayer 3 has a thickness of more than 100 nm.

Next, a reproduction method of the magnetic recording medium 1 by using the magnetic recording/reproducing apparatus is explained.

To begin with, the light beam 14 is radiated onto a reproducing region in the amorphous magnetic layer 4 from the laser beam source inside the laser pickup 11. This increases a temperature in the recording region on which the light beam 14 is radiated, as well as residual magnetization in the recording region. Here, it is preferable that the temperature is increased to a temperature at which the residual magnetization is maximized. Note that residual magnetization in an area (region) on which no light beam 14 is radiated is small, because the area (region) on which no light beam 14 is radiated is maintained at room temperatures.

Then, the magnetic head 12 detects as to magnetic flux leakage from the recording region in which the residual magnetization is caused to be greater. Next, the radiation of the light beam 14 onto the recording region is stopped, so that the temperature in the recording region will be dropped, so as to end the reproduction.

It should be noted that the present embodiment discusses the magnetic recording apparatus that performs recording by the magnetic field application by means of the magnetic head, and by the heating by means of the laser beam, as the magnetic recording apparatus for recording data onto the magnetic recording medium of the present invention. However, the recording of data onto the magnetic recording medium of the present invention is not limited to this, and may be carried out by using a magnetic recording apparatus that performs recording only by the magnetic field application by means of the magnetic head. However, the optically assisted magnetic recording method, in which the heating and the magnetic field application are carried out in combination, is more preferable, in order to restrain deterioration of a signal-to-noise ratio (S/N ratio) due to thermal strain when high-density recording is carried out. Moreover, the present invention may be applied in a magneto-optical recording medium and a magneto-optical recording apparatus, in which a signal is reproduced by magneto-optical effect.

In the following, the present invention is described in more detail, with examples and comparative examples. However, the present invention is not limited to those examples and comparative examples.

To begin with, explained are examples as to how the underlayer having the irregular surface is manufactured, referring to an first example and first and second comparative examples.

Note that an mean thickness of an aluminum film in the example was measured in the following method. Firstly, the aluminum film was formed only for 25 minutes under a certain condition. Then, the thickness of the aluminum film was measured by a small-difference measuring device. The thickness was 70 nm. Based on this, it was calculated out that an average speed of film formation was 2.8 nm per minute. Then, the aluminum film was formed under the same condition but in various period of time for forming the film (period of film formation). The mean thickness was worked out by multiplying the period of film formation and the speed of film formation (2.8 nm per minute).

FIRST EXAMPLE

Figure 4:
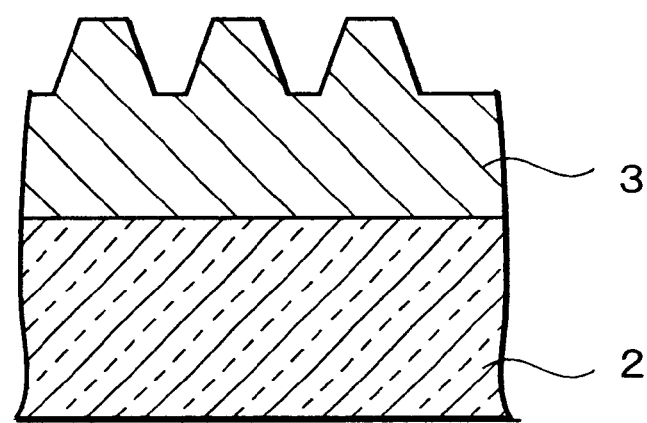
FIG. 4 is a cross-sectional view showing a structure of a sample for observation of a surface of an underlayer of the embodiment of the present invention.

In the present example, as shown in FIG. 4, an observation sample was prepared by forming an aluminum film, as an underlayer 3 having an irregular surface, on a substrate 2. A configuration of a surface (surface structures) of the aluminum film was observed by an Atomic Force Microscope (AFM). Note that the inventors of the present application carried out the observation of the surface, paying a great attention on the configuration of the surface of the aluminum film in order to find out a reason why the aluminum film improved the recording density.

Firstly, a glass-disc substrate was prepared as the substrate 2. A surface of the glass-disc substrate was cleaned by the reverse sputtering (etching) by means of a radio frequency (RF) sputter.

Next, the aluminum film was formed on the glass-disc substrate by the Direct Current (DC) magnetron sputtering method, so that the aluminum film had an mean thickness of 3.7 nm. In this way, the observation sample (hereinafter, referred to as a "first sample") was prepared. In addition, the sputtering was performed under such conditions that a sputter pressure was 0.5 Pa, a power supply for sputtering was DC 300 W, a sputter gas used was an Argon (Ar) gas, and a flow of the argon gas was fixed at 50 SCCM. Note that the terms "SCCM" is the abbreviation of "Standard Cubic Centimeters per minute", a unit of a flow that is worked out by converting a volume of a flowing gas into a volume of the gas in a standard state, for each minute.

Moreover, apart from the first sample, two kinds of observation samples were prepared in the same fashion as the first sample, except that the two kinds of observation samples were so prepared that the aluminum films had mean thicknesses of 2.8 nm and 5.8 nm, respectively (hereinafter, the two kinds of observation samples are referred to as the "second sample" and "third sample").

Next, surfaces of the aluminum films of the first to third sample were observed by using the AFM, so as to evaluate how the surface structure was changed depending on the mean thickness of the aluminum films. The surface observation (measuring) by the AFM was carried out in a contact mode by using an MMAFM (Multi Mode Atomic Force Microscope) made by Digital Instrument (DI) corp.

Figure 5:
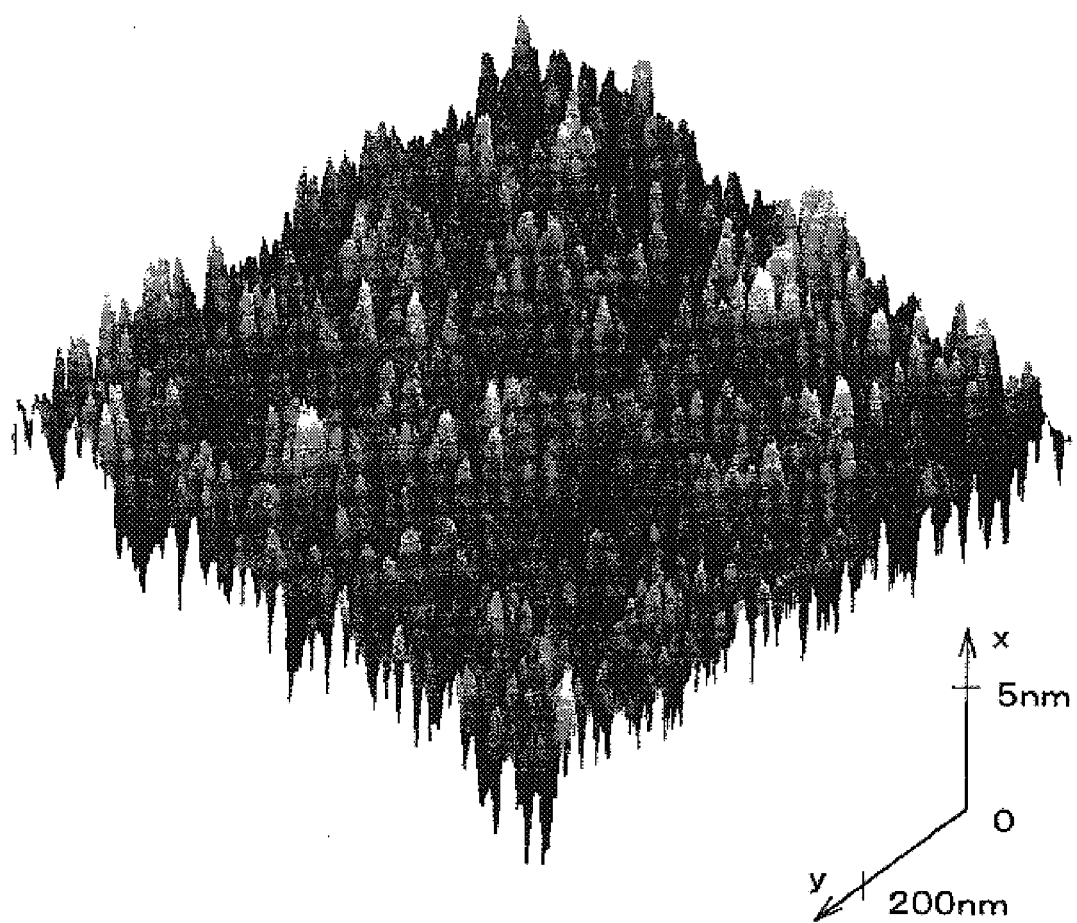
FIG. 5 is a view showing microscopic observation of the surface of the underlayer of the magnetic recording medium of the embodiment of the present invention by using an atomic force microscope.

The observation by the AFM showed that, in the first sample, thus formed swelling (bumps) existed in high density on the surface of the aluminum film, as shown in FIG. 5. Here, the first sample was prepared so that the aluminum film was formed at the sputter pressure of 0.5 Pa and the aluminum film had the mean thickness of 3.7 nm. It was concluded that the thus formed patches were crystal particles of aluminum. It was found that the crystal particles had pyramid shapes, and had an average particle diameter (diameter D of the bumps) of 35 nm, and an average height (height H of the bumps) of 6 nm. It was also found that an average roughness (Ra) in a region of 1 $\mu$m×1 $\mu$m on the surface of the aluminum film was 1.56 nm. Note that the x axis indicates a normal direction on the surface of the aluminum film and the y axis indicates a direction parallel to the surface of the aluminum film, in FIG. 5. Moreover, the terms "particle diameter of the crystal particles" indicates an average particle diameter of the crystal particles.

FIG. 8 shows a result of the observation of the surface of the aluminum film in the normal direction.

Figure 7:
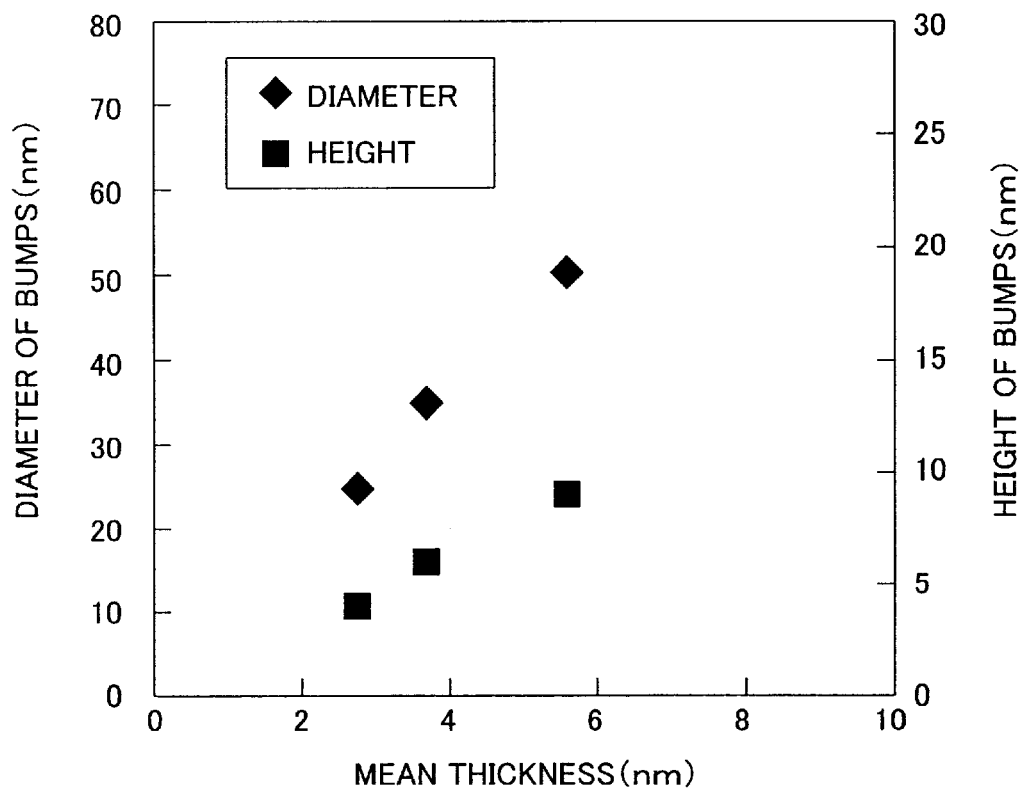
FIG. 7 is a graph correlation between (a) an average film thickness of the underlayer and (b) a diameter and height of a bump on the surface of the underlayer, in the magnetic recording medium of the embodiment of the present invention.

Moreover, the second and the third samples, which had aluminum film of different thicknesses, were observed by the AFM. The observation showed that the crystal particles had identical shapes to those in the first sample. However, the observation showed that both particle diameters (diameters D of the bumps) and heights (heights H of the bumps) of the crystal particles were changed (increased or decreased) substantially in direct proportion to the mean thickness, as shown in FIG. 7. Moreover, average roughness (Ra) of the surface of the aluminum film was also changed (increased or decreased) substantially in direct proportion to the mean thickness, even though it is not shown here. In the second sample, the height of the crystal particles was 4 nm, and the average roughness of the surface of the aluminum film was 1.11 nm. Therefore, it was found out that there was a direct-proportional relationship between (a) the mean thickness and (b) the particle diameter and height of the crystal particle, and the roughness of the aluminum film, where the films were prepared under the same film formation conditions, such as the sputter pressure. Note that in FIG. 7 the abscissa is the mean thickness of the aluminum film (2.8 nm, 3.7 nm and 5.6 nm), while the axis of ordinates is the particle diameters and the heights of the crystal particles, plotting the particle diameters of the crystal particles (reference signs ♦) and the heights of the crystal particles (reference signs ■), which respectively correspond to the mean thicknesses of the aluminum film. FIG. 7 shows that both of the particle diameter and the height had a linear proportional relationship with the mean thickness. This showed that the particle diameter of the crystal particle can be controlled by controlling the mean thickness.

It is expected from the results that the bumps on the surface of the aluminum film (the particle diameter of the crystal particles) have a particle diameter in a range from 1 nm to 50 nm, and a height (the height of the crystal particles) in a range from 3 nm to 10 nm, when the aluminum film has a mean thickness ranging from 2 nm to 6 nm. It is expected that the diameter D (particle diameter of the crystal particles) of the bumps on the surface of the aluminum film is less than 100 nm, when the aluminum film has an average thickness of 10 nm or less.

Moreover, a plurality of samples, which were prepared with the same mean thickness (3.7 nm) but different sputter pressure ranging from 0.25 Pa to 2.0 Pa, were observed. No significant change was observed in terms of shapes of the crystal particles, as a result of the changes in the sputter pressure. However, detailed observation revealed that the surface structure was finer and the shape of the crystal particles was converted into a circular cone shape, as the sputter pressure was increased.

Moreover, a sample that was prepared by performing etching by an RF sputter after formation of an aluminum film so as to process a surface structure of the aluminum film, was also examined. This sample was prepared by forming an aluminum film of a mean thickness of 4.7 nm on a glass-disc substrate under the same conditions for film formation as the first sample, and right after that, by etching 1 nm of the mean thickness by the RF sputter.

Thus etched sample was observed by the AFM as to a surface of its aluminum film. The observation showed that crystal particles in the sample had a basically identical shape to those of the samples to which no etching was carried out, in other words, the crystal particles had a pyramid shape. Moreover, the crystal particles had a particle diameter (diameter D of the bumps) of 40 nm, which was equal to a predicted value worked out from the before-etching mean thickness of 4.7 nm. On the other hand, the crystal particles had a height of 4 nm, which was lower than not only a predicted value worked out from the before-etching mean thickness of 4.7 nm, but also a predicted value worked out from the after-etching mean thickness of 3.7 nm. In short, the etching reduced only the height of the crystal particles, but did not affect the particle diameter of the crystal particles. Thus, it was found out that the height of the crystal particles can be reduced by etching.

First Comparative Example

For making a comparison, a glass-disc substrate that was cleaned to the RF sputter etching was observed as to its surface configuration by the AFM, in the same fashion as the first example. The observation showed circular cone shaped patches (bumps) that had a particle diameter (diameter of the bumps) of 300 nm, a height (height of the bumps) of 3 nm. However, a ratio of the diameter to the height was as small as 1:100. Thus, it was possible to conclude so that the circular cone-shaped patches observed were waviness of a surface of the glass-disc substrate with a 300 nm cycle.

FIG. 10 shows a result of the observation of the surface of the glass-disc substrate by the AFM in the normal direction.

Second Comparative Example

For making a comparison, two kinds of samples that were prepared by forming aluminum nitride films of 5 nm and 60 nm thicknesses respectively on glass-disc substrates that were cleaned by the reverse sputtering by means of RF sputter-etching employed in the example 1. The formation of the aluminum nitride film was carried out by the radio frequency (RF) sputtering method. Moreover, the formation of the film was carried out under such conditions that a sputter gas was a gaseous mixture of the argon gas and a nitrogen gas, flows of the argon gas and the nitrogen gas were respectively set to be 25 SCCM, and sputter pressure was 0.2 Pa.

Figure 6:
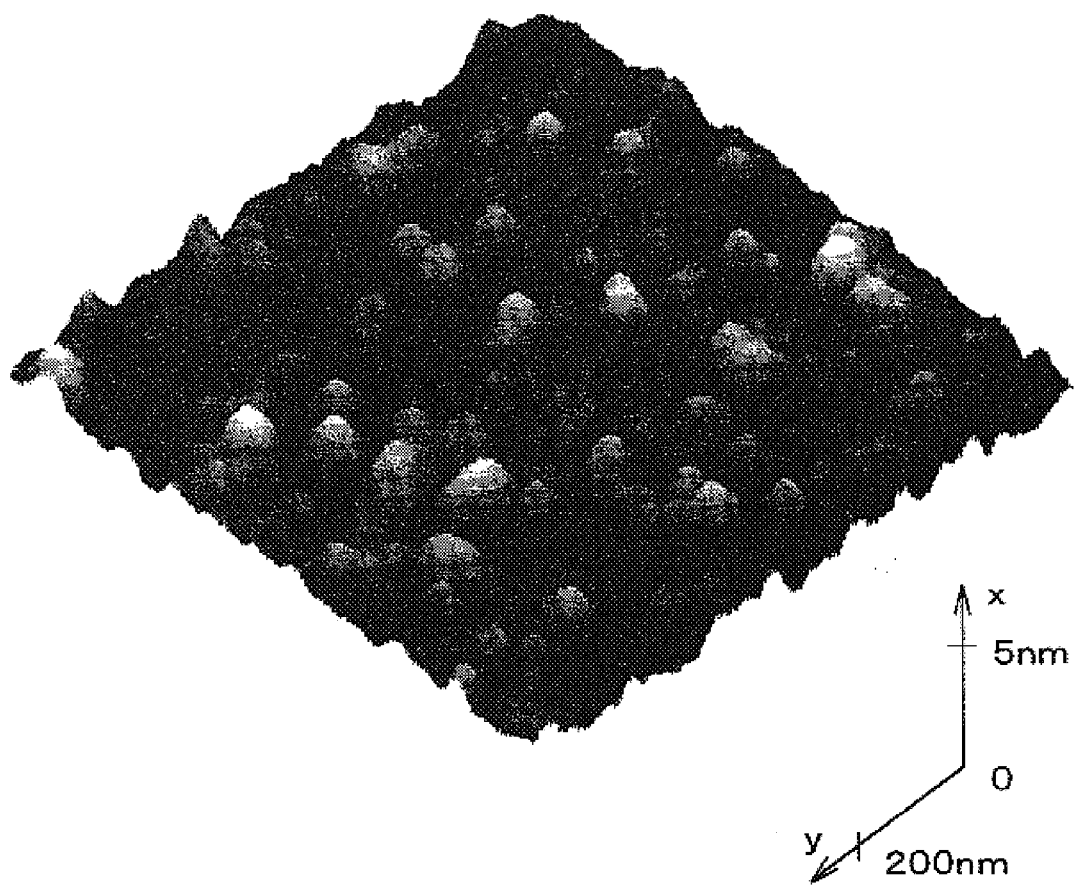
FIG. 6 is a view showing microscopic observation of a surface of an underlayer of a comparative magnetic recording medium by using an atomic force microscope.

Then, those samples were observed as to their surface configuration by the AFM, in the same manner as the first example. The observation found circular-cone shaped (or a circular-disc shaped) patches (bumps) in the sample of the aluminum nitride film of the mean thickness of 60 nm. The patches had a size (diameter of the bumps) of 100 nm, and a height (height of the bumps) of 3 nm, as shown in FIG. 6. Moreover, a substantially identical surface structure was observed in the sample of the aluminum nitride film of the mean thickness of 5 nm. Note that the x axis indicates a normal direction of the surface of the aluminum nitride film, and the y axis indicates a direction parallel to the surface of the aluminum nitride film in FIG. 6.

The comparison between FIGS. 5 and 6 shows that the aluminum nitride film of the 60 nm mean thickness, which is used as an underlayer in a conventional optically assisted magnetic recording medium, had a comparatively flat surface structure, while the aluminum film of the first example had irregularities having a small size (diameter of bumps), which were composed of substances that were in particulate-like shapes and in high density.

SECOND EXAMPLE

In the present example, the magnetic recording medium 1 of the previously-described example was prepared by using the first sample (which was prepared by forming the aluminum film of 3.7 nm mean thickness as the underlayer 3 on the glass-disc substrate as the substrate 2) of the first example.

To begin with, on an irregular surface of the aluminum film (hereinafter, referred to as an "Al underlayer) as the underlayer 3 of the first sample of the first example, a TbFeCo film (an amorphous alloy film made of Tb, Fe, and Co) was formed as the amorphous magnetic layer (recording layer) 4. Next, on the amorphous magnetic layer 4, an amorphous carbon (a-c) film (carbon-type protective layer) was formed as a protective layer 5. The amorphous carbon film is used in general hard discs. It is preferable that the TbFeCo film is formed after the underlayer 3 is formed on the substrate 2, in order that the TbFeCo film will have a pinning effect.

The TbFeCo film and the amorphous carbon film were formed by using the Direct Current (DC) magnetron sputtering method, in the same way as the formation of the aluminum film in the preparation of the first sample of the first example. Moreover, the TbFeCo film and the amorphous carbon film were formed under such conditions that a sputter gas was the argon (Ar) gas, and a flow of the argon gas was fixed to 50 SCCM.

In the sputtering for the formation of the TbFeCo film, an alloy having a composition ratio (atom %) of Tb:Fe:Co of 23 at %: 60 at %: 17 at % was used, sputter pressure used was 0.45 Pa, and thickness of the film was 50 nm. Thus formed TbFeCo film had a magnetic compensation point (compensation temperature) of 50° C., and its Curie temperature was 250° C. Meanwhile, the amorphous carbon film was formed under such conditions that sputter pressure was 1.0 Pa and a thickness of the film was 20 nm.

Finally, a lubricating agent of the perfluoro polyoxyalkane type was applied, as the lubricating layer 6, on a surface of the amorphous carbon film by a dip coater, thereby forming a film of the lubricating agent, the film having a thickness of 0.8 nm.

Third Comparative Example

For making a comparison, a magnetic recording medium having a conventional arrangement, that is, an arrangement having no underlayer, was prepared, using the sample (glass-disc substrate) of the first comparative example. In order to exactly evaluate an effect of the Al underlayer itself, the magnetic recording medium was prepared from the sample of the first comparative example by the same process as the magnetic recording medium of the second example, which was prepared from the first sample. Therefore, the magnetic recording medium of the present comparative example had an arrangement identical to that of the magnetic recording medium of the second example, except that the magnetic recording medium of the present comparative example had no Al underlayer.

Fourth Comparative Example

For making a comparison, a magnetic recording medium having a conventional arrangement, that is, an arrangement having an aluminum nitride film of 60 nm mean thickness as an underlayer was prepared, using the sample of the second comparative example in which the aluminum nitride film was provided on the glass-disc substrate. For exact evaluation of an effect due to differences in raw materials of the underlayer, the magnetic recording medium was prepared from the sample of the second comparative example by the same process as the magnetic recording medium of the second example, which was prepared from the first sample. Therefore, the magnetic recording medium of the present comparative example had an arrangement identical to that of the magnetic recording medium of the second example, except that the magnetic recording medium of the present comparative example had the aluminum nitride film, instead of the Al underlayer, as the underlayer.

Next, by using an optically assisted magnetic recording/reproducing apparatus for evaluation, data was actually recorded/reproduced onto/from the magnetic recording media prepared in the second example, the third and fourth comparative examples. Then, evaluation as to recording/reproduction properties of those examples were carried out. Especially, recording frequency properties, which are parameters for high-density recording, were examined in detail. Moreover, shapes of recording marks formed on the samples were observed by an Magnetic Force Microscope (MFM).

The optically assisted magnetic recording/reproducing apparatus for evaluation used was the previously-described magnetic recording/reproducing apparatus having the arrangement shown in FIG. 2. Moreover, a laser pickup 201, which was provided with a laser beam source having an oscillating frequency of 400 nm, and an objective lens 206 having a Numerical Aperture (NA) of 0.65 was used so as to focus a laser beam. As a magnetic head 202, a thin film inductive type magnetic head incorporated with a GMR (Giant Magneto Resistive) element. In addition, it was so set that an amount of lifting of the magnetic head 202 was set to about 28 nm. Rotating speed of a spindle 203 (rotating speed of the magnetic recording medium 1) was set to 36.00 rpm. Here, the magnetic recording medium 1 had a linear velocity of 11 m/sec.

In this evaluation test, direct current (DC) erasion was carried out, first. Then, magnetic recording was performed by optical assist. Next, reproduction was carried out by the optical assist. Thereby, the magnetic recording/reproducing properties were measured. The DC erasion was carried out under such conditions that the laser beam source had an output (laser power) of 5 mW, and the magnetic head 202 had a magnetic field current (head magnetic field current) of 20 mA. Moreover, the magnetic recording by the optical assist was performed under such conditions that the laser beam source had an output of 5 mW, and the magnetic head 202 had a magnetic field current of 10 mA. Moreover, the reproduction by the optical assist was carried out under such conditions that the laser power source had an output of 2 mW and the GMR element had a bias current of 5 mA.

The recording frequency properties, in other words, how signal qualities were changed in accordance with changes in frequency (recording frequency) of the magnetic field application were examined as a parameter for high-density recording on the magnetic recording medium, by the inventors of the present application examined.

The recording density was changed in direct-proportion to the recording frequency, and a shortest length of a recording mark was changed in inverse proportion to the recording frequency. Under the conditions of the present evaluation test, where the magnetic recording medium 1 had the linear velocity of 11 m/sec, the magnetic head 202 having a recording frequency of 25 MHz gave a shortest length of the recording mark of 220 nm, and the magnetic head 202 having the recording frequency of 50 MHz caused a shortest length of the recording mark to be 110 nm.

Figure 3:
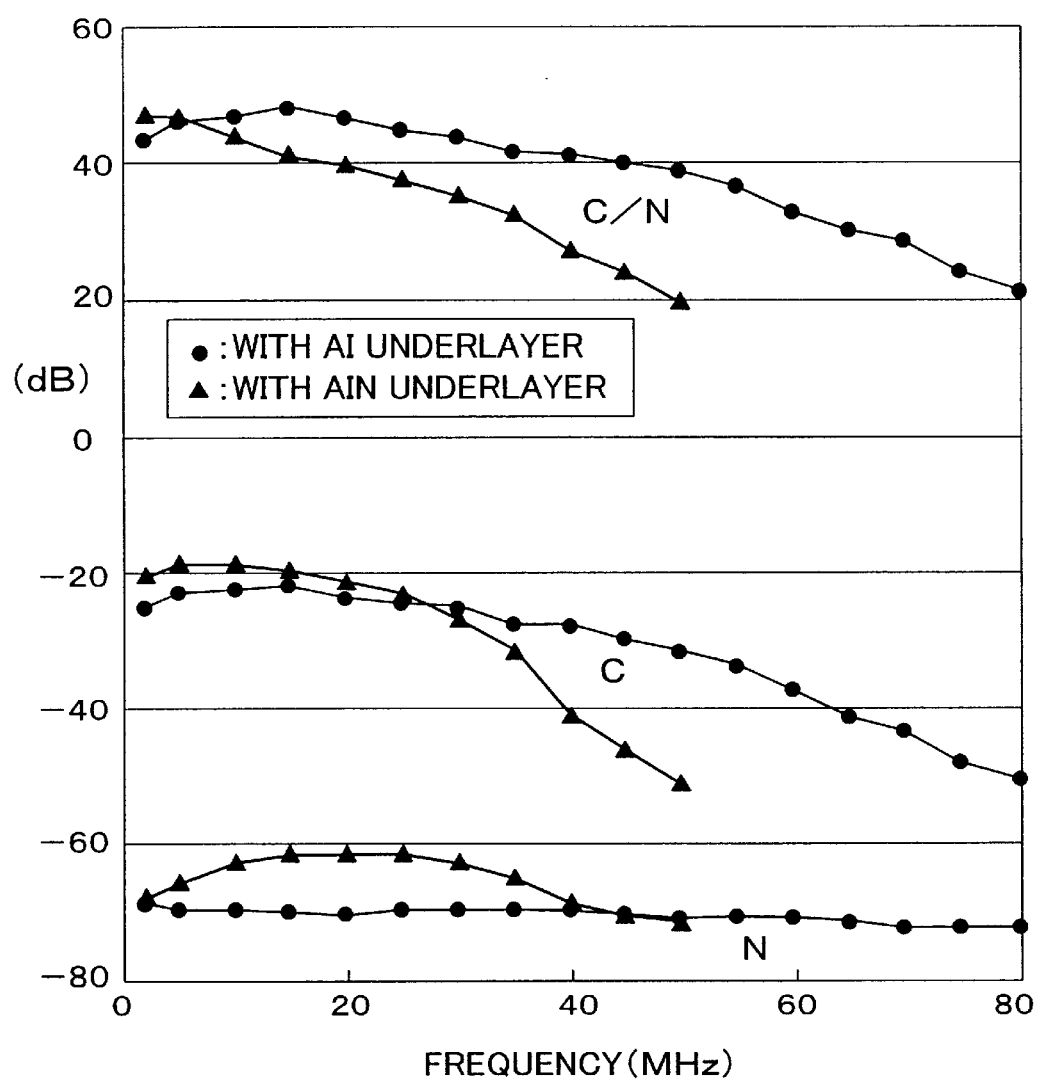
FIG. 3 is a graph illustrating recording frequency properties of the magnetic recording medium of the embodiment of the present invention and a comparative magnetic recording medium.

Moreover, in the present evaluation test, a carrier signal level (C value) and a noise level (N value) were measured when the recording frequency was changed, so that a ratio of those values, that is, a carrier to noise (C/N value) was obtained as a parameter to evaluate the signal qualities of the recording mark. FIG. 3 shows the measurements result (recording frequency properties) thus obtained.

The reference signs ● (WITH Al UNDERLAYER) plotted in FIG. 3 indicate measurement results of the recording frequency properties of the magnetic recording medium of the example 2 in which the Al underlayer was used. It was found that in the magnetic recording medium of the example 2 the C/N value does not decrease (drop) at a gradient that is so distinctly large, within a range of the recording frequency up to 80 MHz, so that signal will be recording in a high signal quality even when the recording frequency is high. Furthermore, it was confirmed by observation of a magnetic image by means of the MFM that no deterioration in a track width nor breaking-off of the recording mark occurred, giving good properties, until the recording frequency reached to 80 MHz.

The reference signs ▲ (WITH AlN UNDERLAYER) plotted in FIG. 3 indicate measurement results of the recording frequency property of the magnetic recording medium of the comparative example 4 in which the aluminum nitride film was used as the underlayer. Here, the C value decreased sharply when the recording frequency reached to 25 MHz. Moreover, the observation of its magnetic image showed that the track width was narrowed and the breaking-off of the recording mark occurred when the recording frequency exceeded 25 MHz. Those indicated that it suddenly becomes impossible for the recording mark to exist stably when the recording frequency exceeds 25 MHz, thereby deteriorating the signal quality. Thus, it could be said that 25 MHz of the recording frequency is maximum for capacity of the magnetic recording medium. Moreover, it is expected that about 200 nm is maximum for the shortest length of the recording mark in the AlN underlayer.

In view of the signal quality, the recording frequency of 25 MHz had the C/N value of slightly less than 40 dB (38 dB) in the magnetic recording medium of the fourth comparative example in which the aluminum nitride film was used as the underlayer. Therefore, in the magnetic recording medium of the fourth comparative example, a smallest value of the shortest length of the recording mark for obtaining the C/N value of 40 dB was longer than about 220 nm.

Generally, the C/N value necessary for signal processing is set to 30 dB or higher. Thus, it is preferable that the C/N value is at least 30 dB or more in view of the signal quality. In the magnetic recording medium of the fourth comparative example, a highest recording frequency for obtaining the C/N value of 30 dB was less than 40 MHz. Because the recording frequency of 40 MHz causes the shortest length of the recording mark to be 137 nm, the smallest value of the shortest length of the recording mark for obtaining C/N value of 30 dB was longer than 137 nm in the magnetic recording medium of the fourth comparative example.

On the contrary, in the magnetic recording medium of the example 2 in which the Al underlayer was used, the C/N value of about 40 dB (39 dB) was achieved when the recording was carried out with the recording frequency of 50 MHz. Therefore, in the magnetic recording medium of the example 2, the smallest value of the shortest length of the recording mark for obtaining the C/N value of 40 dB was approximately 110 nm. Moreover, the C/N value was 30 dB when the recording was performed with a recording frequency of 65 MHz. Because the shortest length of the recording mark is 85 nm when the recording frequency is 65 MHz, the smallest value of the shortest length of the recording mark for obtaining the C/N value of 30 dB was 85 nm in the magnetic recording medium of the second example.

Moreover, the magnetic recording medium of the third comparative example having no underlayer was measured for its recording frequency properties in the same fashion. According to the measurements, the smallest value of the shortest length of the recording mark for obtaining the C/N value of 40 dB was about 200 nm.

Moreover, the magnetic recording medium of the second example was measured for its surface recording density. According to the measurements, the C/N value was 30 dB when the track width was 0.3 µm, and the shortest length of the recording mark was 70 nm. Here, the surface recording density was 40 gigabit per square inch (6.2 gigabit per $cm^2$). Furthermore, the C/N value was 30 dB when the track width was 0.15 µm and the shortest length of the recording mark was 80 nm. Here, the surface recording density exceeded 70 gigabit per square inch (10.85 gigabit per $cm^2$). The magnetic recording media of the third and fourth comparative examples were distinctly different in terms of their surface recording densities, showing that a significant effect was obtained.

As described above, in the magnetic recording medium of the second example, the use of the aluminum film as the underlayer significantly improved the magnetic recording medium in capacity as a magnetic recording medium, compared with the magnetic recording medium of the fourth comparative example. Moreover, the use of the aluminum film as the underlayer provided a magnetic recording medium that can be easily gone into mass production because the magnetic recording medium has only one layer between its substrate and magnetic layer.

Finally, provided here is Table 1 in which (a) the smallest values (mark length) of the shortest lengths of the recording marks for obtaining the C/N value of 40 dB, which were obtained in the recording/reproducing evaluation results of the second example, the third and the fourth comparative examples (whose underlayers were respectively: Al, none (only substrate), and AlN), are set forth together with (b) the particle diameters (the diameters D of the bumps), (c) the heights, (the height H of the bumps) and (d) surface roughness (the Ra) of the irregular surfaces (aluminum film surface, glass substrate surface and aluminum nitride film surface) that were in contact with (put together with) the TbFeCo film, which were obtained via the observation by the AFM.

TABLE 1

|  |  | 2nd. Ex. | 3rd. Com. | 4th Com. |
|---|---|---|---|---|
| Under- layer | Type | Al | None (substrate) | AlN |
|  | Mean T. | 3.7 | — | 60 |
| Par. Dia. (nm) |  | 35 | 150 | 120 |
| Height (nm) |  | 6 | 3 | 4 |
| Ra (nm) |  | 1.56 | 0.88 | 0.57 |
| Shortest L. |  | 100 | 200 | 200 |

Abbreviation:
2nd Ex. = Second Example.
3rd Com. = Third Comparative Example.
4th Com. = Fourth Comparative Example.
Mean T. = Mean thickness.
Par. Dia. = Particle Diameter.
Ra = Average Roughness.
Shortest L. = Shortest Length of the recording mark.

Table 1 shows that the provision of the aluminum film as the underlayer is effective for high-density recording, because the second example having the aluminum film as the underlayer had the shortest one of the smallest values of the shortest lengths of the recording marks for obtaining the C/N value of 40 dB. Therefore, it was deduced that the minute irregularities on the aluminum film allowed the minute recording mark to stably exist, thereby realizing the high-density optical assist recording/reproduction. Moreover, according to Table 1, in order to obtain a sufficiently high signal quality (the C/N value of 40 dB), it is preferable that the diameter D is sufficiently small with respect to the shortest length of the recording mark.

THIRD EXAMPLE

In the same way as the second example, magnetic recording media were produced from the second and third samples prepared in the first example, which had the Al underlayers respectively having the mean thicknesses of 2.8 nm and 5.6 nm, thus the second and third samples having the mean thicknesses different from the first sample. Moreover, in the same manner as the second example, magnetic recording media were produced from the samples prepared in the first example, where one of the samples was prepared in such a manner that the Al underlayer was formed under the sputter pressure of 0.25 Pa to 2.0 Pa (the one of the sample was identical to the first sample, except the sputter pressure condition), while another of the samples was prepared by using the RF reverse sputter etching (the another of the samples had the Al underlayer having the mean thickness of 3.7 nm). In other words, the magnetic recording media were produced, using the Al underlayers having the irregular structures whose bumps had the diameters D (the particle diameters of the crystals) of 25 nm to 50 nm, and the heights H (the heights of crystals) of 4 nm to 9 nm.

Then, recording/reproduction properties of each magnetic recording medium were measured in the same way as the magnetic recording medium of the second example, by using the optically assisted magnetic recording/reproducing apparatus for evaluation. The measurements showed that there was no significant difference among the samples, and all the samples showed good capacities for recording in high density, so that and the samples were equivalent to the second example in terms of the capacities for recording in high density.

Therefore, it was found that the optically assisted magnetic recording of high density is significantly affected by the Al underlayer having the mean thickness of 2.8 nm to 5.6 nm, that is, the Al underlayer having the irregular structure whose bumps have the diameter D (the particle diameter of crystal) in a range from 25 nm to 50 nm, and the height H (the height of the crystal) in a range from 4 nm to 9 nm.

From this, it is expected that use of an Al underlayer having an irregular structure whose bumps have a diameter D ranging from 10 nm to 50 nm and a height H ranging from 3 nm to 10 nm gives an effect similar to that obtained in the second example. Moreover, as described above, it is expected that the Al underlayer has the diameter D of the bumps ranging from 10 nm to 50 nm and the height H of the bumps ranging from 3 nm to 10 nm when the Al underlayer has the mean thickness within the range from 2 nm to 6 nm. Therefore, when the Al underlayer had the mean thickness within the range from 2 nm to 6 nm, it is possible to have the effect similar to that obtained in the second example.

As discussed above, according to the examples of the present embodiment, the formation of Al underlayer right below the recording layer (magnetic layer) realizes the stable formation of the recording mark in the optically assisted magnetic recording medium, even in case of the high-density recording (in which the shortest length of the recording mark is 100 nm or less).

Note that aluminum is formed as polycrystal when the film of aluminum is formed at room temperatures. Therefore, it is deduced in the above-mentioned examples that the irregularities on the surface of the Al underlayer were composed of aluminum crystal particles.

However, in case the particles of aluminum need be formed in a smaller size for a greater high-density recording, it is effective to cool down a temperature of the substrate 2 below room temperatures so as to form the film of aluminum. In this case, more minute aluminum particles are formed. However, there is a risk that the aluminum particles are formed as minute amorphous particles in this case.

FOURTH EXAMPLE

In a present example, a material other than aluminum were used as the raw material of the underlayer 3 in order to form the irregular structure on the underlayer 3. Specifically, an observation sample (hereinafter, referred to as a "fourth sample") was prepared in the same manner as the first example, except that, instead of aluminum, silver (Ag) was used as the raw material of the underlayer 3, so that an Ag film would be formed on substrate 2 so as to have a mean thickness of 2.5 nm.

Next, in the same way as the first example, a surface of the Ag film of the fourth sample was observed by using the AFM. FIG. 9 shows a result of the observation of the fourth sample observed from a normal direction of the substrate 2 by the AFM.

Here, irregularities having a particle diameter (diameter of bumps) of 30 nm, and a height (height of the bumps) of 6 nm were formed in high density (density was 1200 bumps per $\mu m^2$). Thus, the Ag film was substantially identical to the Al film in terms of the particle diameter and the height. Moreover, when the mean thickness of the Ag film was variously altered, the size of the irregularities (the particle diameter and the height) was changed in proportion to the mean thickness, similarly to the case of the Al film.

FIFTH EXAMPLE

Next, a magnetic recording medium, which had an underlayer having irregularities other than the Al film, was produced from the fourth sample prepared in the fourth example, for making a comparison. In order to exactly evaluate effects due to the different raw material of the underlayer, the magnetic recording medium was produced from the fourth sample by a process identical to the process of manufacturing the magnetic recording medium from the first sample in the second example. Therefore, the magnetic recording medium of the present embodiment had the same arrangement as the above-mentioned first magnetic recording medium (hereinafter, referred to as the "first magnetic recording medium") having the Al underlayer, except that the magnetic recording medium of the present embodiment had the Ag film having the mean thickness of 2.5 nm as the underlayer, instead of the Al film having the mean thickness of 3.7 nm.

Next, by using the optically assisted magnetic recording/reproducing apparatus for evaluation, data was actually recorded/reproduced onto/from the magnetic recording medium prepared in the second example (hereinafter, referred to as the "first magnetic recording medium"), the magnetic recording medium prepared in the third comparative example (hereinafter, referred to as the "second magnetic recording medium") and the magnetic recording medium prepared in the fifth example (hereinafter, referred to as the "third magnetic recording medium"), so as to evaluate their recording/reproducing properties. An optical assist recording/reproducing method, which was basically identical to the method in the second example, but uses a laser beam source having an oscillation frequency of 650 nm.

Figure 14:
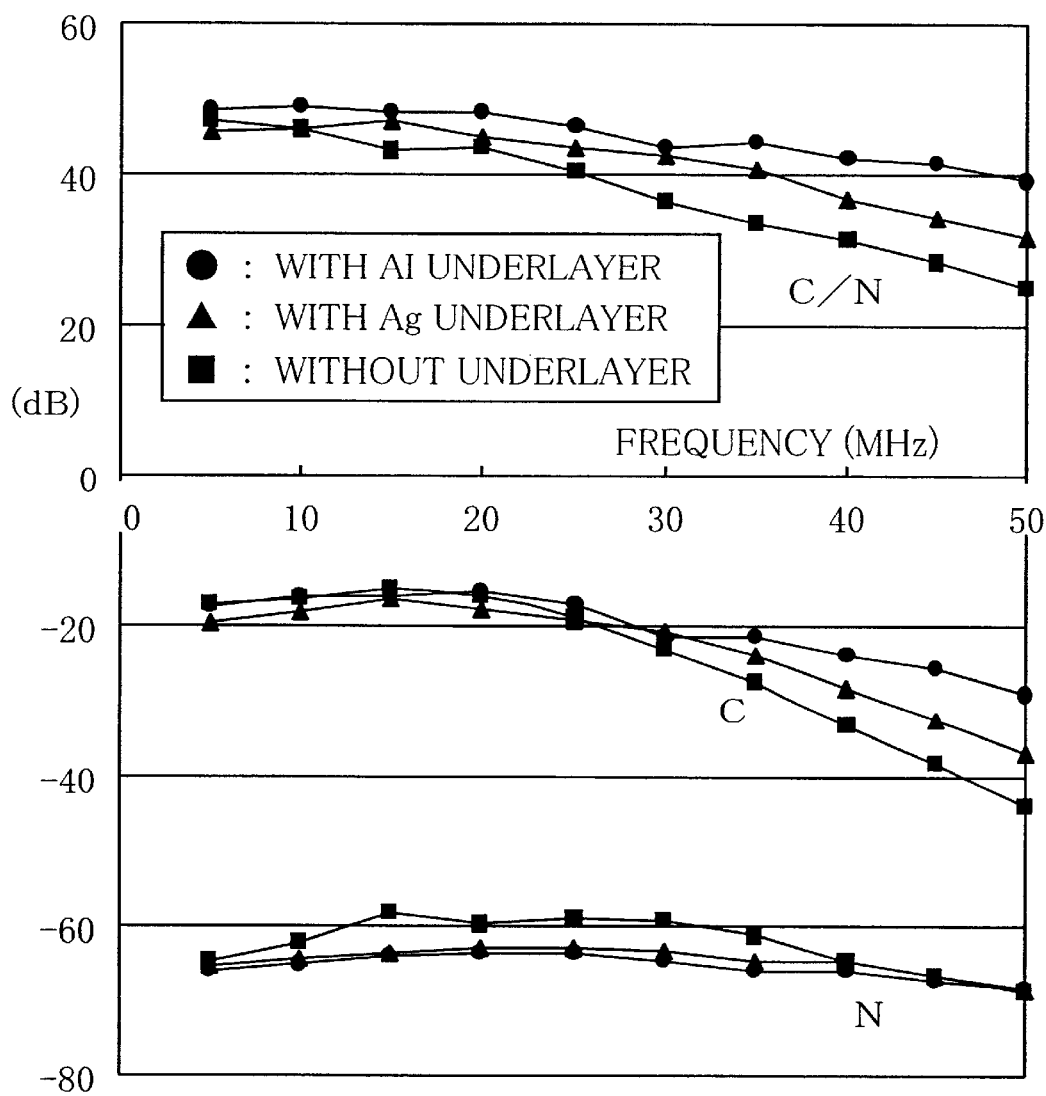
FIG. 14 is a graph showing recording frequency properties of the magnetic recording medium of the embodiment of the present invention, the magnetic recording medium of the another embodiment of the present invention, and the comparative magnetic recording medium.

FIG. 14 shows results (recording frequency properties) measured in the above.

The reference signs ● plotted in FIG. 14 show the results of the measurement of the recording frequency properties of the first magnetic recording medium (denoted as the "WITH Al UNDERLAYER" in FIG. 14) of the second example having the Al underlayer. It was found that the first magnetic recording medium of the second example had no decline (drop) of the C/N value with a distinct gradient within a range of the recording frequency from 5 MHz to 50 MHz, and the C/N value of about 40 dB could be maintained in the range in the first magnetic recording medium. Therefore, it was found that the first magnetic recording medium had good recording frequency properties. Furthermore, it was confirmed by the observation of magnetic image that by means of the MFM that no deterioration of the track width nor breaking-off of the recording mark was caused when the recording frequency was in a range from 5 MHz to 100 MHz. Therefore, it was found that the first magnetic recording medium had good recording properties.

The reference signs ▲ plotted in FIG. 14 show results of the measurement of the recording frequency properties of the third magnetic recording medium (denoted as the "WITH Ag UNDERLAYER" in FIG. 14) of the fifth example having the Ag underlayer. It was found that the magnetic recording medium of the fifth example had a better recording frequency properties, compared with a conventional magnetic recording medium having no underlayer. The magnetic recording layer of the fifth example mentioned the C/N value to be about 40 dB or more when the recording frequency was within a range from 5 MHz to 35 MHz. However, the C/N value was declined (dropped) with a large gradient (of a curve) when the recording frequency exceeded 35 MHz.

The reference signs plotted in FIG. 14 show results of the measurement of the recording frequency properties of the second magnetic recording medium (denoted as the "WITHOUT UNDERLAYER" in FIG. 14) of the third comparative example. In this case, the C value was sharply decreased when the recording frequency reached 25 MHz. Moreover, the C/V value was maintained at about 40 dB only when the recording frequency was Within a range from 5 MHz to 25 MHz. Moreover, observation of a magnetic image observed that the track width was narrowed and the recording mark was broken off when the recording frequency exceeded 25 MHz. Those indicated that it suddenly becomes impossible for the recording mark to exist stably when the recording frequency exceeds 25 MHz, thereby deteriorating the signal quality. Note that the case where the aluminum nitride (AlN) film was used as the underlayer 3 also showed results close to the plotting of the reference signs.

As described above, the use of the underlayers improved capacities as a magnetic recording medium in the magnetic recording media of the second and the fifth examples, compared with the magnetic recording medium of the third comparative example.

Furthermore, even though both the magnetic recording media of the second and fifth examples had irregularities on the surfaces of the underlayers 3, the magnetic recording medium of the second example using the aluminum film as the underlayer 3 was significantly improved in terms of the capacities as a magnetic recording medium, especially, in terms of the recording frequency properties (recording density), compared with the magnetic recording medium of the fifth comparative example using the silver film.

Next, the inventors of the present application carefully examined surface configurations of the magnetic layers of the magnetic recording media, in addition to the surface configurations of the underlayers, in order to find out a reason why the frequency properties (recording density) of the magnetic recording medium of the second example so significantly improved compared with the magnetic recording medium of the fifth example.

Sample for the observation of the surface of the magnetic layers were prepared in the following manner. The magnetic recording media of the second example, the third comparative example, and the fifth example were produced by forming films on the substrate 2, namely the underlayer 3, the amorphous magnetic layer 4, the protective layer 5, and the lubricating layer 6, in this order. However, for preparing the samples here, the formation of films was stopped at a stage of the formation of the amorphous magnetic layer 4. In other words, magnetic recording media were produced by the manufacturing method of the magnetic recording media in the second example, the third comparative example, and the fifth example, but without forming the protective layer 5 and the lubricating layer 6, so that the magnetic recording media thus produced had the amorphous magnetic layer 4 as their top surfaces. In this manner, obtained were three kinds of magnetic recording media which respectively had the amorphous magnetic layer layered on (a) the Al underlayer having the surface configuration shown in FIG. 8, (b) the Ag underlayer having the surface configuration shown in FIG. 9, or (c) the glass-disc substrate (no underlayer) having the surface configuration shown in FIG. 10.

Figure 11:
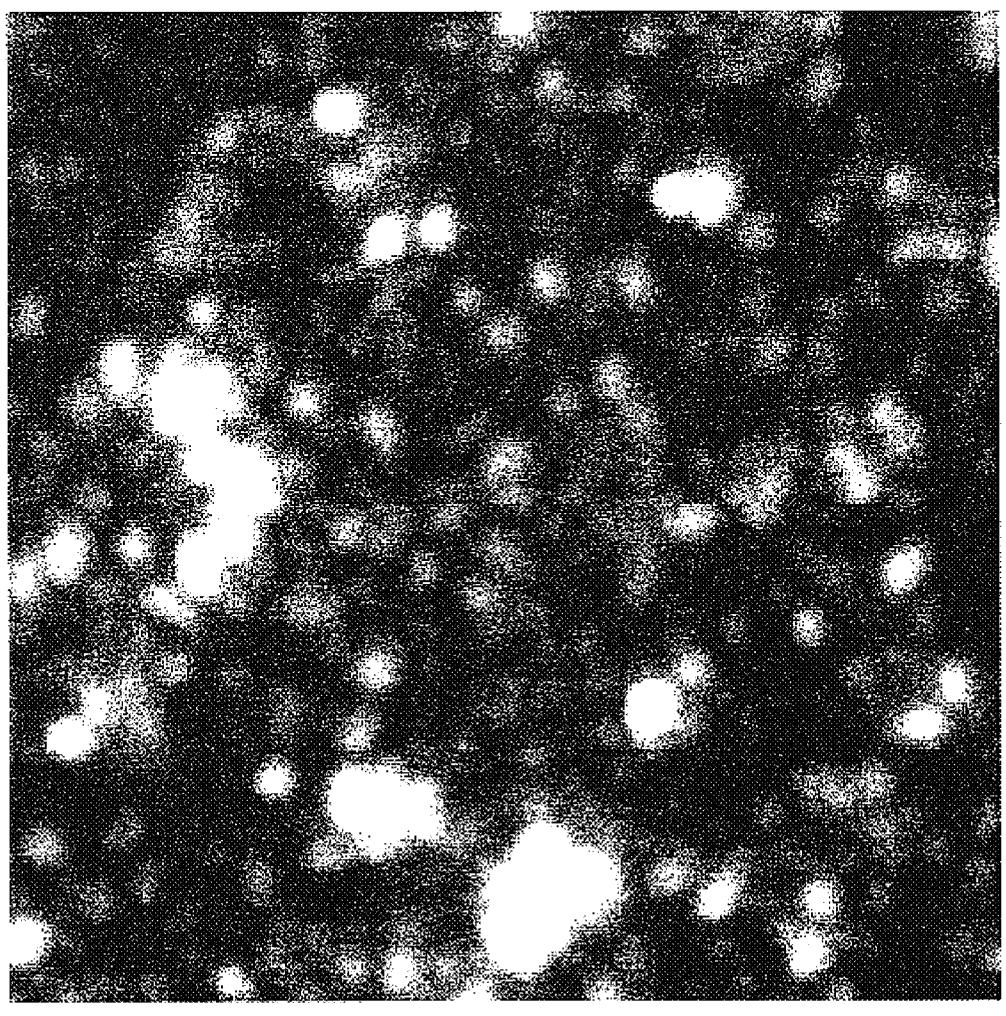
FIG. 11 is a view showing microscopic observation in which a surface of an amorphous magnetic layer of the magnetic recording medium of the embodiment of the present invention was observed in a normal direction by using an atomic force microscope.
Figure 12:
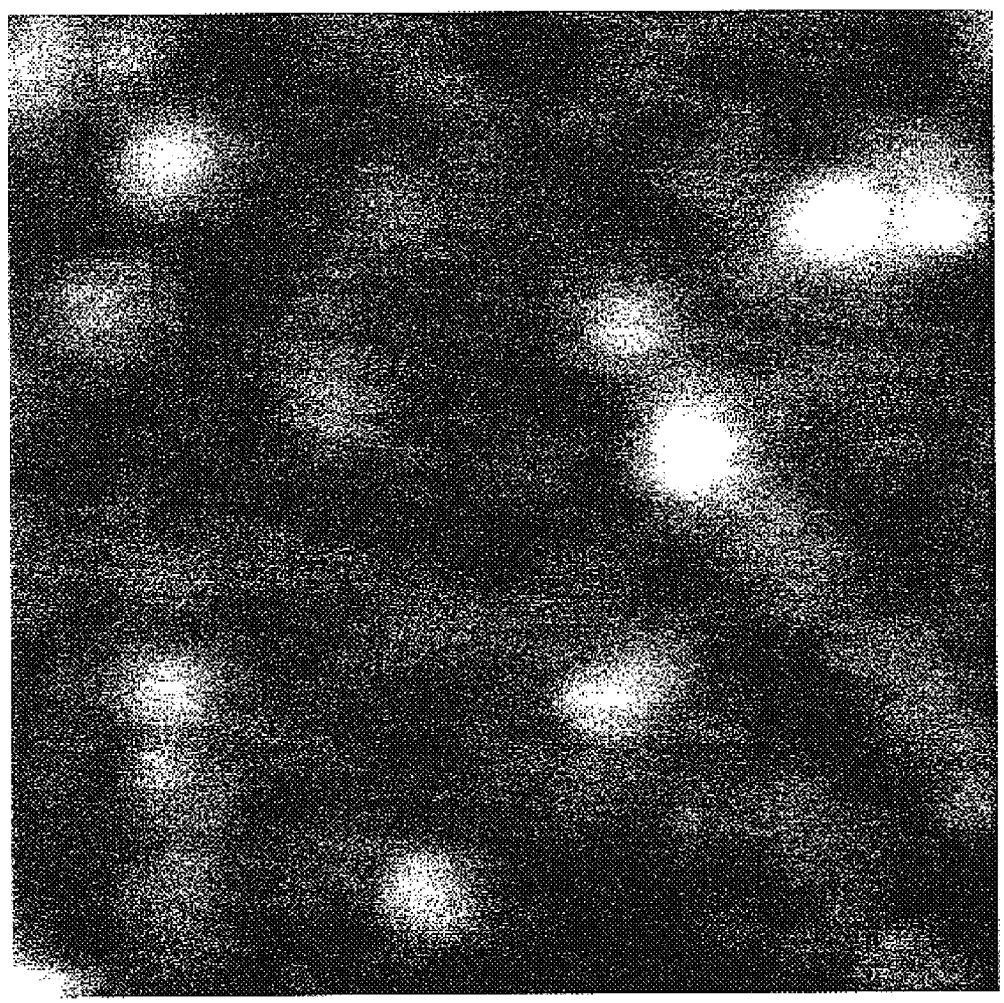
FIG. 12 is a view showing microscopic observation in which a surface of an amorphous magnetic layer of the magnetic recording medium of the another embodiment of the present invention was observed in a normal direction by using an atomic force microscope.

FIGS. 11, 12, and 13 respectively show results of observation of surfaces of (a) the magnetic recording medium in which the amorphous magnetic layer was layered on the Al underlayer, (b) the magnetic recording medium in which the amorphous magnetic layer was layered on the Ag underlayer, and (c) the magnetic recording medium in which the amorphous magnetic layer was layered on the glass-disc substrate. The observation was carried out by observing the surfaces in their normal direction by the AFM.

As shown in FIGS. 8 and 11, it was observed in the case where the Al film was formed as the underlayer 3 that not only the underlayer 3 had, on its surface, the minute irregularities due to the crystal particles or amorphous particles of Al, but also the magnetic layer had, on its surface, minute irregularities that were equivalent to the irregularities on the surface of the underlayer 3 in terms of sizes and density. This indicated that the surface configuration of the underlayer 3 was passed down to the surface of the amorphous magnetic layer 4 (the surface configuration of the amorphous magnetic layer 4 was shaped based on the surface configuration of the underlayer 3). Therefore, the irregularities on the surface of the underlayer 3 affects the surface of the amorphous magnetic layer 4, thereby giving a large pinning effect. Moreover, a surface roughness of the surface of the amorphous magnetic layer 4 was measured. The measurement showed the amorphous magnetic layer 4 had a surface roughness of 1.0 nm.

Moreover, respectively observed by using the AFM were surfaces of (a) magnetic recording medium having a protective layer 5 in addition to the component elements (the substrate 2, the underlayer 3 and the amorphous magnetic layer 4) of the above-mentioned magnetic layer, and (b) magnetic recording medium having a protective layer 5 and a lubricating layer 6 in addition to the component elements of the above-mentioned magnetic layer. The observation showed that both the media had an irregular configuration according to the surface configuration of the underlayer 3. In short, it was confirmed that it is possible to quantitatively examine the surface configuration of the underlayer 3 by observing the configuration of the surface of the protective layer 5 or that of the lubricating layer 6 of the magnetic recording medium. Therefore, evaluation of the magnetic recording medium as to whether or not the magnetic recording medium can be recorded in high density, can be performed by examining the surface of the protective layer 5 or that of the lubricating layer 6. Thus, it is not necessary to directly examine the surface of the underlayer 3 for the evaluation.

As shown in FIGS. 9 and 12, it was observed in the case where the Ag film was formed as the underlayer 3 that the underlayer 3 had, on its surface, minute irregularities due to the crystal particles or the amorphous particles of Ag. However, in this case, the observation found that minute irregularities were very few on the surface of the amorphous magnetic layer 4. Moreover, a surface roughness of the surface of the amorphous magnetic layer 4 was measured. The measurement showed that the amorphous magnetic layer 4 had a surface roughness of 0.5 nm. Moreover, a magnetic recording medium having the amorphous magnetic layer 4 on its top surface was produced. This magnetic recording medium was produced to be identical to the above-mentioned magnetic recording media, except that its amorphous magnetic layer 4 had a thickness of 25 nm, which was half of the above-mentioned magnetic recording media. While no figure is provided here, the magnetic recording medium having the amorphous magnetic layer 4 of the 25 nm thickness was observed by using the AFM in the same manner. The observation found that minute irregularities were very few on the surface of this amorphous magnetic layer 4. In other words, the Ag underlayer did not affect the surface of the amorphous magnetic layer 4, even though the Ag underlayer had the minute irregularities on its surface. This indicated that the Ag underlayer had a poorer ability in preventing the magnetic domain walls from moving, compared with the Al underlayer. Therefore, for high-density recording, it is better to use the Al film for the underlayer, rather than the Ag film.

As shown in FIGS. 10 and 13, in the case where no underlayer 3 was formed, that is, in case of glass-disc substrate (with no underlayer), it was observed that both the substrate and the amorphous magnetic layer had only little of the minute irregularities on their surface.

Therefore, in the magnetic recording medium of the present invention that includes the underlayer 3 having the irregular configuration, it is preferable that the irregular configuration of the surface of the underlayer 3 is passed down up to the surface of the amorphous magnetic layer 4, in order to achieve very good recording frequency properties, that is, in order to realize recording in very high recording density. Moreover, it was found out that the surface configuration of the magnetic film is one of parameters to evaluate the properties. Thus, it is possible to evaluate the magnetic recording medium as to whether or not the magnetic recording medium is such a magnetic recording medium in which the movement of the magnetic domain walls is effectively prevented, and with which the high-density recording is possible, simply by observing the magnetic recording layer by means of the AFM, directly if the protective layer is so thin, or after removing the protective layer from the magnetic recording medium, if not.

SIXTH EXAMPLE

Next, to find out an optimized mean thickness of the underlayer 3 (aluminum film) (that is, an optimized size of the irregularities on the surface of the underlayer 3), a series of magnetic recording media including underlayers 3 which were formed in the sample way as the manufacturing process of the first magnetic recording medium in the first and second examples, except that the underlayers 3 were so formed as to have mean thicknesses of 0 nm, 1.0 nm, 2.0 nm, 3.0 nm, 3.7 nm, 4.0 nm, 5.0 nm, 6.0 nm, and 8.0 nm, respectively.

The series of magnetic recording media thus produced were subjected to magnetic recording/reproduction by the optical assist. Their frequency properties were evaluated so as to find a mean thickness of the underlayer 3 with which the highest-density recording/reproduction was realized. Note that the optically assisted recording/reproducing method was basically identical to that of the second example, but used a recording current fixed to 30 mA, and a laser beam source having an oscillation frequency of 650 nm.

Figure 15:
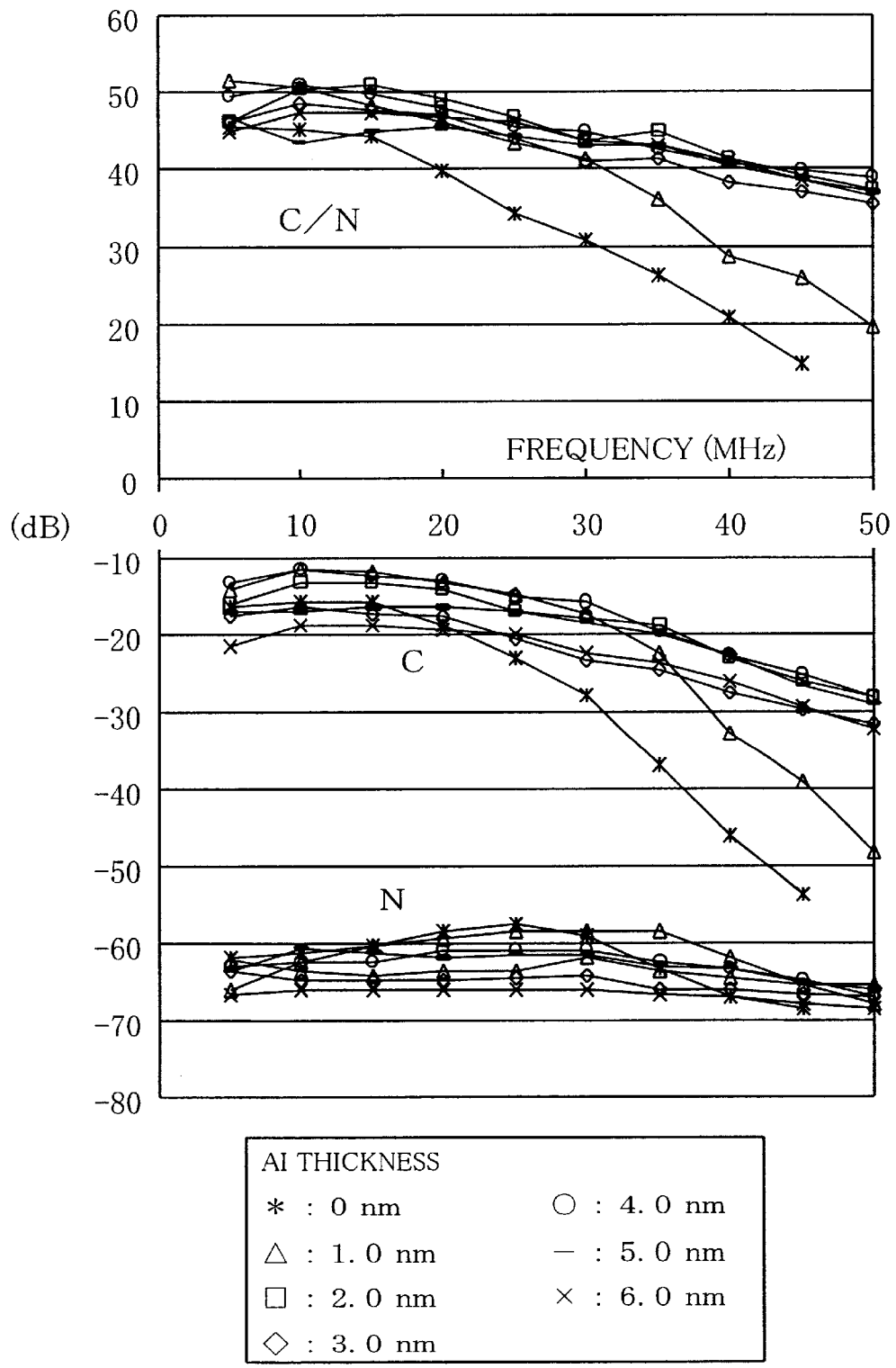
FIG. 15 is a graph showing changes in the recording frequency properties caused by a change in the average layer thickness of the underlayer.

FIG. 15 shows results of the evaluation of the recording frequency properties. As shown in FIG. 15, when the recording frequency was increased to 25 MHz for the case where the underlayer 3 had the 0 nm mean thickness, and to 35 MHz for the case of the underlayer 3 having the 1 nm mean thickness, the C/N value was dramatically deteriorated. It was concluded that the irregularities on the surface of the underlayer 3 were not sufficiently large in size (especially the height of the bumps) when the underlayer 3 was so thin that the thickness of the underlayer 3 was 1 nm or less, whereby the effect of the underlayer 3 was not so significantly exerted. On the other hand, in case the underlayer 3 had a mean thickness in a range from 2 nm to 6 nm, there sudden deterioration of the frequency properties was not started, at least when the recording frequency was about 50 MHz or less, whereby the properties were good and substantially constant. Therefore, it was concluded that it is possible to clearly form a recording bit in the magnetic recording medium having, as the underlayer 3, the aluminum film of the thickness in a range from 2 nm to 6 nm, even when the recording mark is 100 nm in length.

Moreover, the surface of the amorphous magnetic layer 4 of the magnetic recording medium was observed by the AFM. Irregularities that are similar to the irregularities on the surface of the underlayer 3 appears on the surface of the amorphous magnetic layer 4, when the irregularities on the underlayer 3 lifts the amorphous magnetic layer 4 up sufficiently.

The observation showed that not so much minute irregularities due to the underlayer 3 appeared on the surface of the amorphous magnetic layer 4 when the underlayer 3 had the mean thickness of 1.0 nm or less. It was concluded that the effect of the underlayer 3 (the effect to prevent the movement of the magnetic domain walls) was not sufficiently exerted, because the size of the irregularities (especially, the height H of the bumps) was too small.

On the other hand, when the underlayer 3 had the mean thickness ranging from 2 nm to 6 nm, it was clearly observed that the amorphous magnetic layer 4 had the minute irregularities on its surface. Moreover, in case the underlayer 3 had the mean thickness of 3.7 nm, the irregularities shown in FIG. 11 was observed. Here, the irregularities on the surface of the amorphous magnetic layer 4 had such a size that the bumps had a diameter of 30 nm, typically. Based on this, it was concluded that an irregular structure on the surface of the underlayer 3 in this case can exert a sufficient effect (sufficiently act) as pinning sites (constraining sections), even in case the recording density is 50 gigabit per square inch (7.8 gigabit per cm$^2$) or more in which the shortest length of the recording mark is 70 nm, typically. Moreover, here the bumps on the surface of the amorphous magnetic layer 4 had various diameters within a range from 20 nm to 50 nm.

Furthermore, in case the underlayer 3 had the mean thickness of 8.0 nm (exceeding 6.0 nm), irregularities were observed on the surface of the amorphous magnetic layer 4. It was concluded that the irregularities were due to the surface configuration of the underlayer 3. However, the irregularities had bumps that had a diameter of 70 nm or more, which gives a longer shortest length of the recording mark. Thus, such underlayer 3 cannot be used for the high-density recording.

Therefore, it was found that, in case the aluminum film is used for the underlayer 3, the aluminum film has a mean thickness in a range from 2 nm to 6 nm preferably, or a mean thickness in a range from 2 nm to 4 nm, to be optimized for a greater high-density recording.

SEVENTH EXAMPLE

Finally, in order to examine the effect of the underlayer 3, the following sample was prepared for a general magnetic recording/reproducing method in which no optical assist is carried out and the recording and reproduction are performed at room temperature.

A magnetic recording medium of the present example was basically identical to the first magnetic recording medium of the second example in terms of its arrangement and manufacturing method. Thus, the magnetic recording medium of the present example was provided with a substrate 2, an underlayer 3 made of Al, an amorphous magnetic layer (recording layer) 4 made of TbFeCo, a protective layer 5 made of carbon, and a lubricating layer 6. However, the magnetic recording medium of the present example was different from the magnetic recording medium of the second example in that an amount of Tb in the amorphous magnetic layer 4 was adjusted so that the recording/reproduction could be carried out at room temperatures. In other words, in the magnetic recording medium of the present example, the amorphous magnetic layer 4 had a greater amount of Tb so as to reduce a coercive force at room temperatures and intensify magnetization at room temperatures, thereby arranging the magnetic recording medium of the present example to be a magnetic recording medium for performing recording and reproduction at room temperatures.

In the present example, prepared were three kinds of magnetic recording media, which had the underlayers 3 made of Al, respectively having thicknesses of 1.0 nm, 2.0 nm, and 3.7 nm. Moreover, as a comparative magnetic recording medium, a magnetic recording medium in which the underlayer 3 has a thickness of zero, that is, no underlayer 3 was provided.

Figure 16:
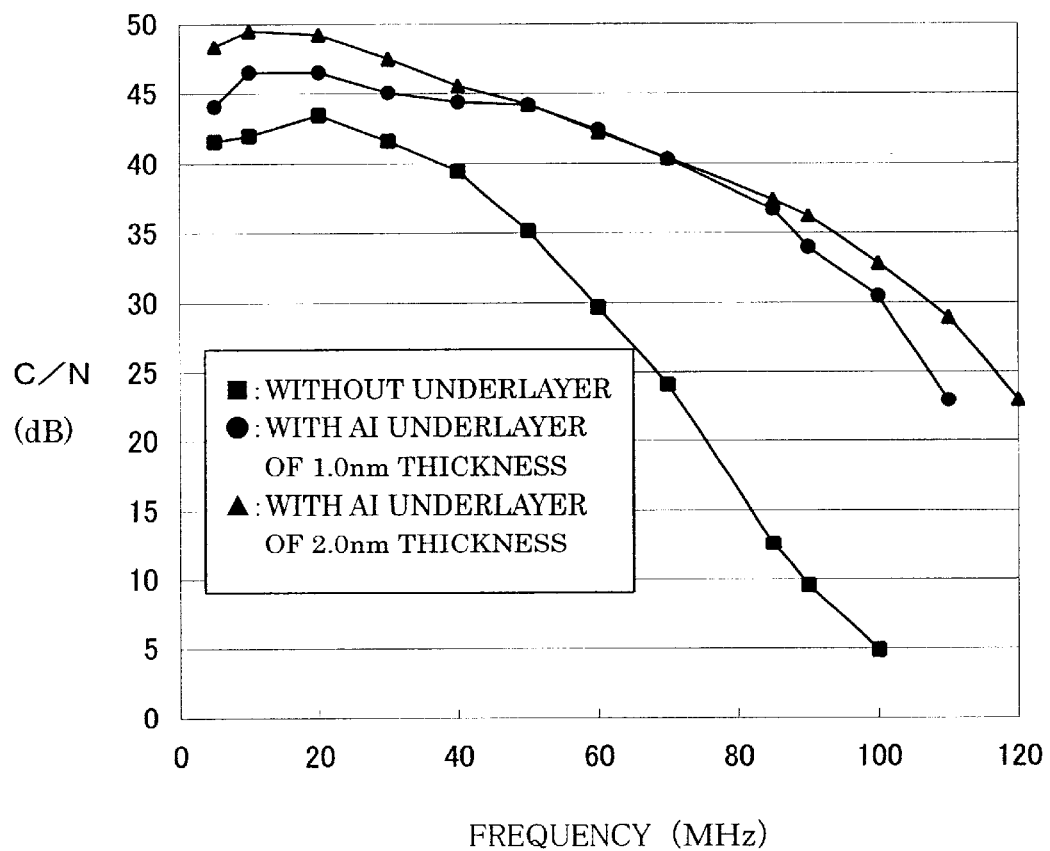
FIG. 16 a graph showing changes in the recording frequency properties caused by a change in the average layer thickness of the underlayer, in a general magnetic recording method in which no optical assist is performed.

Those four kinds of magnetic recording media were subjected to recording/reproduction, and their recording/reproduction properties were evaluated. The recording/reproduction was performed by using only a magnetic head, without laser radiation (optical assist), in the same way as a general magnetic recording apparatus. FIG. 16 shows results of the evaluation of the recording/reproduction.

As illustrated in the graph in FIG. 16, it was confirmed that the magnetic recording media of the present invention having the underlayers 3 had frequency properties explicitly improved and high-density recording was possible with those magnetic recording media, compared with the comparative magnetic recording medium having no underlayer 3. Under a condition that the C/N value was 30 dB or more, the comparative magnetic recording medium having no underlayer 3 had a recording frequency of 60 MHz or less, meanwhile the recording media of the present invention respectively having the underlayers 3 of 1.0 nm and 2.0 nm thickness achieved a recording frequency exceeding 100 MHz. However, it was impossible to narrow a track width in case of the room temperature recording (recording performed at room temperature), unlike the optically assisted recording.

On the other hand, it was found that the magnetic recording medium showed surface anisotropy when its underlayer 3 had the thickness of 3.7 nm, thereby causing thermal strain and being unsuitable for the high density recording. Therefore, it was found that, even in the general magnetic recording without optical assist, the high density recording is possible when the underlayer 3 made of Al has a thickness of at least 1.0 nm or more, and a greater high-density recording is possible when the underlayer 3 has a thickness ranging from 1.0 nm to 2.0 nm.

A magnetic recording medium of the present invention, as described above, is provided with (1) a substrate, and a magnetic layer, made of an amorphous magnetic material, for magnetic recording of data, or (2) a substrate, and a magnetic layer for magnetic recording of data by applying heat and a magnetic field, the magnetic recording medium further including an underlayer provided between the substrate and the magnetic layer, and the underlayer being made of a non-magnetic metal element, and being put together with the magnetic layer.

In the respective arrangements, where the underlayer made of a non-magnetic metal element, it is possible to form, on the surface of the underlayer that is put together with the magnetic layer, the irregularities due to the crystal particle or amorphous particle of the non-magnetic metal element. In addition, the irregularities have such a minute size (diameter of the bumps), compared with irregularities on a surface of the underlayer made of aluminum nitride, which is used in a conventional optically assisted magnetic recording medium. The irregularities on the surface of the underlayer being put together with the magnetic layer have such a function to act as constraining sections (pinning sites) for preventing the magnetic domain walls of the magnetic layer from moving. For this reason, the respective arrangements can limit the movement of the magnetic domain walls of the magnetic layer within a shorter range, compared with the conventional optically assisted magnetic recording medium (the first prior art) including an underlayer made of aluminum nitride. Moreover, in the respective arrangements, where the underlayer made of a non-magnetic metal element is provided so as to be put together with the magnetic layer, it is possible to effectively limit the movement of the magnetic domain walls of the magnetic layer, compared with the third prior art in which the aluminum layer is provided with respect to the substrate side of the magnetic layer (a side of the magnetic layer that faces to the substrate), sandwiching the nitriding silicone layer.

Because of those, the magnetic recording media of the respective arrangements form the minute recording mark, stably. As a result, the magnetic recording media of the respective arrangements attain a sufficient signal quality even when performing high-density recording by forming such a minute recording mark whose shortest length is 100 nm or less.

This effect is so distinct in case where the magnetic layer is made of an amorphous magnetic material such as the TbFeCo magnetic material or the like. The reason is explained in the following. The recording mark is separated by crystal grain boundaries in a magnetic recording medium in which a recording layer made of a polycrystal magnetic material (for example a CoCr alloy type of magnetic material) is used. In contrast, the recording mark never is separated by the crystal grain boundaries in the magnetic recording medium of the present invention in which the magnetic layer made of a non-magnetic material. In the magnetic recording medium of the present invention, it is considered that the recording marks exist continuously over the whole surface of the medium in terms of magnetization. For this reason, exchange interaction forces between the recording marks are relatively large, and there is not so many factors that limit the movement of the magnetic domain walls. Therefore, to limit the movement of the magnetic domain walls of the magnetic layer is important.

Moreover, the effect is distinct in case where the magnetic recording of data onto the magnetic layer is performed by applying heat and the magnetic field. The reason is explained below. In case the magnetic recording of data is carried out by applying heat and the magnetic field, the recording region is heated for performing recording, thereby significantly reducing the coercive force and magnetic anisotropy in the magnetic field. This results in a high tendency toward the movement of the magnetic domain walls. For this reason, it is important to limit the magnetic domain walls of the underlayer. As a result, more distinct is the effect to improve the signal quality when the high-density recording is performed with respect to the underlayer.

Furthermore, in the respective arrangements, where the underlayer is made of a non-magnetic metal element, there is not such a problem that a magnetic material is precipitated as a result of heating and the like, unlike the second prior art, in which the underlayer is made of a magnetic metal element. Therefore, there is no need of providing a protective layer, such as a carbon protective layer or the like, between the underlayer and the magnetic layer. Moreover, there is no need of providing a nitriding silicone layer (binding layer) between the underlayer and the substrate. This allows the magnetic recording medium of the present invention to have a simplified layer structure (to reduce the number of layers in the layer structure), and to be easily mass produced, compared with the second prior art. Therefore, the respective arrangements provide a magnetic recording medium in which the heating does not causes a severe thermal deterioration, and which can have a simplified layer structure and can be easily mass produced.

A magnetic recording medium of the present invention, as described above, is provided with (1) a substrate, and a magnetic layer, made of an amorphous magnetic material, for magnetic recording of data, or (2) a substrate, and a magnetic layer for magnetic recording of data by applying heat and a magnetic field, the magnetic recording medium further including an underlayer provided between the substrate and the magnetic layer, and the underlayer being made of a non-magnetic metal element, and being put together with the magnetic layer.

In the respective arrangements, where the underlayer made of a metal element, it is possible to easily form, on the surface of the underlayer that is put together with the magnetic layer, the irregularities due to the crystal particles or amorphous particles of the metal element. In addition, the irregularities have such a minute size (diameter of the bumps), compared with irregularities on a surface of the underlayer made of aluminum nitride, which is used in a conventional optically assisted magnetic recording medium. This makes it possible to form, on a surface (the underlayer or a layer provided between the underlayer and the magnetic layer) that is put together with the magnetic layer, irregularities of more minute size (diameter of the bumps) compared with the conventional magnetic recording media (the first and the third prior arts). The irregularities on the surface of the layer being put together with the magnetic layer have such a function to act as constraining sections (pinning sites) for preventing the magnetic domain walls of the magnetic layer from moving. For this reason, the respective arrangements can limit the movement of the magnetic domain walls of the magnetic layer within a shorter range, compared with the conventional optically assisted magnetic recording media. Thereby, the magnetic recording media of the respective arrangements form the minute recording mark stably. As a result, the magnetic recording media of the respective arrangements attain a sufficient signal quality even when performing high-density recording by forming such a minute recording mark whose shortest length is 100 nm or less.

This effect is so distinct in case where the magnetic layer is made of an amorphous magnetic material such as the TbFeCo magnetic material or the like, and in case the magnetic recording of data onto the magnetic layer is performed by applying the heat and the magnetic field. As described above, this is because there is a high tendency toward the movement of the magnetic domain walls and it is important to limit the movement of the magnetic domain walls, in those cases.

Furthermore, the underlayer is made of a non-magnetic metal element also in the respective arrangements. Because of this, there is not such a problem that a magnetic material is precipitated as a result of heating and the like, unlike the second prior art, in which the underlayer is made of a magnetic metal element. Therefore, there is no need of providing a protective layer, such as a carbon protective layer or the like, between the underlayer and the magnetic layer. Moreover, there is no need of providing a nitriding silicone layer (binding layer) between the underlayer and the substrate. This allows the magnetic recording medium of the present invention to have a simplified layer structure (to reduce the number of layers in the layer structure), and to be easily mass produced, compared with the second prior art. Therefore, the respective arrangements provide a magnetic recording medium in which the heating does not causes a severe thermal deterioration, and which can have a simplified layer structure and can be easily mass produced.

Moreover, in the respective arrangements, in which the underlayer has the mean thickness of 10 nm or less, it is possible to form irregularities having more minute size (diameter of the bumps), on the surface of the layer (the underlayer or the layer existing between the underlayer and the magnetic layer) that is put together with the magnetic layer, compared with the third prior art in which an aluminum layer having a thickness of 40 nm is used. Therefore, it is possible to limit the movement of the magnetic domain walls within a short range, so as to form a minute recording mark stably. As a result, it is possible to further improve the signal quality, in case such high-density recording that the shortest length of the recording mark is 100 nm or less.

In the magnetic recording media of the respective arrangements, it is preferable that the mean thickness of the underlayer is in a range from 2 nm to 10 nm (2 nm or more and 10 nm or less).

With the above arrangement, where the mean thickness of the underlayer is 2 nm or more, it is possible to form irregularities having a sufficiently large size (diameter of the bumps), on the surface of the layer that is put together with the magnetic layer. Because of this, the movement of the magnetic domain walls is effectively restrained. Therefore, it is possible to form a minute recording mark stable so that the high-density recording will be performed in a sufficient signal quality.

Moreover, in the magnetic recording media of the respective arrangements, it is more preferable that the mean thickness of the underlayer is in a range from 2 nm to 6 nm (2 nm or more and 6 nm or less).

With the above arrangement, where the mean thickness of the underlayer is in the range between 2 nm and 6 nm, it is possible to form irregularities having a sufficiently large size (diameter of the bumps), on the surface of the layer that is put together with the magnetic layer. Because of this, the movement of the magnetic domain walls is effectively restrained. Therefore, it is possible to form a more minute recording mark stable so that the high-density recording will be performed in a sufficient signal quality.

A magnetic recording medium of the present invention is, as described above, provided with a substrate, a magnetic layer for magnetic recording of data, and an underlayer provided between the substrate and the magnetic layer, wherein the underlayer is made of a non-magnetic metal element and has an irregular surface that faces to the magnetic layer, the irregular surface having bumps having a diameter of less than 100 nm.

With the above arrangement, where the irregularities including bumps having the diameter of less than 100 nm, it is possible to form irregularities having a more minute size (diameter of the bumps), on the surface of the layer (the underlayer or the layer existing between the underlayer and the magnetic layer) that is put together with the magnetic layer, compared with the conventional optically assisted magnetic medium in which the underlayer is the aluminum nitride having on its surface irregularities having a diameter of 100 nm or more, and the third prior art in which an aluminum layer having a thickness of 40 nm is used. Because of this, the movement of the magnetic domain walls can be limited within a shorter range, so that a minute recording mark will be formed stably, compared with the conventional optically assisted magnetic recording medium and the third prior art. As a result, a sufficient signal quality is attained, even in case high-density recording is performed by forming such a minute recording mark that the recording mark has a shortest length of 100 nm or less.

Furthermore, with the above arrangement, where the underlayer is made of a non-magnetic metal element, there is no need of providing a protective layer, such as a carbon protective layer or the like, between the underlayer and the magnetic layer, while there is no need of providing a nitriding silicone layer (binding layer) between the underlayer and the substrate. Because of this, it is possible to reduce the number of layers, compared with the second prior art. Thereby, it is possible to provide a magnetic recording medium that is easily mass-produced, compared with the second prior art.

For the magnetic recording medium having any one of those arrangements, it is preferable that the non-magnetic metal element is aluminum.

With the above arrangement, it is possible to form irregularities having a more minute size (diameter of the bumps), on the surface that touches (is put together with) the magnetic layer, while it is possible to form, on an outer surface (that is a surface that does not face to the substrate) of the magnetic layer, irregularities that are equivalent to the irregularities on the surface of the underlayer. Thereby, it is possible to efficiently restrain the movement of the magnetic domain walls. As a result, it is possible to further improve the signal quality in case high-density recording is performed by forming the minute recording mark that the recording mark has the shortest length of 100 nm or less.

For the magnetic recording medium having any one of the above arrangements, it is preferable that a magnetic compensation temperature is 25° or more.

This provides a magnetic recording medium that is highly stable against heat, and is suitable for the optically assisted magnetic recording.

The magnetic recording medium, whose magnetic compensation temperature is 25° C. or more, can be realized by designing the magnetic layer to be suitable with respect to the underlayer.

Note that, in the invention of the present application, the terms "magnetic compensation temperature" indicate a temperature, which is less than the Curie temperature, and at which the magnetization seems to be substantially zero.

It is preferable for the magnetic recording medium of the present invention that the magnetic layer is for including a track having a plurality of recording marks, an irregular structure being provided on a surface of the underlayer that faces to the magnetic layer, wherein bumps on the surface of the underlayer has a diameter smaller than a shortest length of the recording mark of the track (a size of the recording mark, along a longitudinal direction of the track).

This limits the movement of the magnetic layer to a level that is sufficient to prevent disturbance of the recording mark, such as overlapping of recording marks. As a result, it is possible to provided a recording medium in which recording is performed with a sufficient signal quality.

Moreover, it is preferable for the magnetic recording medium of the present invention that the magnetic layer stores data in a surface recording density of 40 gigabit per square inch [Gb/inch$^2$] (6.2 gigabit per cm$^2$[Gb/cm$^2$]).

When the surface recording density is increased to 40 gigabit per square inch or more, the shortest length of the recording mark is shorten to be very short (for example, 80 nm). In the magnetic recording medium, which have more minute irregularities than the conventional medium, it is possible to prevent the signal quality from being deteriorated, even when the surface recording density is increased so much. As a result, it is possible to provide a magnetic recording medium, in which the recording of data is performed in the surface recording density of 40 gigabit per square inch or more, and with which a sufficient signal quality is attained.

As described above, a magnetic recording apparatus of the present invention for magnetically recording data onto a magnetic recording medium having any one of the arrangements described above, the magnetic recording apparatus magnetically recording data onto the magnetic layer, is provided with magnetic field applying means for applying a magnetic field on the magnetic layer, the magnetic field orientating magnetization of the magnetic layer.

With the above arrangement, where the magnetic recording medium having any one of the arrangements described above is used, it is possible to provide a magnetic recording medium with which the high-density recording can be performed in a sufficient quality.

As described above, a magnetic recording apparatus of the present invention for magnetically recording data onto a magnetic recording medium having any one of the arrangements described above, the magnetic recording apparatus magnetically recording data onto the magnetic layer, is provided with (1) light beam radiating means for radiation a light beam locally onto a portion of the magnetic layer, the light beam locally heating the magnetic layer, and (2) magnetic field applying means for applying a magnetic field on at least part of the portion of the magnetic layer on which the light beam is radiated, the magnetic field orientating magnetization of the magnetic layer.

With the above arrangement, where the magnetic recording medium having the above mentioned feature, it is possible to provide a magnetic recording medium with which the high-density recording can be performed in a sufficient quality.

Moreover, with the above arrangement, a region in which the recording is performed is limited to a region in which the light beam radiating region overlaps the magnetic field applying region, because the above arrangement adopts a magnetic recording method, in which the portion of the magnetic layer is locally heated by the radiation of the light beam by means of the light beam radiating means, the magnetic field applying means applying a magnetic field on at least part of the portion of the magnetic layer on which the light beam is radiated, that is, the optically assisted magnetic recording method. Therefore, it is possible to reduce the width of the recording track. Thus, the high-density recording is possible.

Furthermore, in the optically assisted magnetic recording method, the coercive force of the magnetic layer is reduced and the magnetic anisotoropy of the magnetic layer are significantly decreased, because the recording region (recording mark) is heated when the recording is performed. Because of this, in the optically assisted magnetic recording method, there is a tendency toward the movement of the magnetic domain walls. Thus, it is important to limit the movement of the magnetic domain walls by the underlayer, in the optically assisted magnetic recording method. As a result, the improvement of the signal quality by the underlayer during the high-density recording is more distinct in the optically assisted magnetic recording method.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A magnetic recording medium, comprising:
   a substrate;
   a magnetic layer, made of an amorphous magnetic material, for magnetic recording of data; and
   an underlayer provided between the substrate and the magnetic layer,
   wherein the underlayer is made of a non-magnetic metal element and is put together with the magnetic layer and has an irregular surface having bumps with a diameter of less than 100 nm, and
   wherein crystal particles are formed on the surface of the underlayer.

2. The magnetic recording medium as set forth in claim 1, wherein the non-magnetic metal element is aluminum.

3. The magnetic recording medium as set forth in claim 1, wherein a magnetic compensation temperature is 25° C. or more.

4. A magnetic recording medium, comprising:
   a substrate;
   a magnetic layer, made of an amorphous magnetic material, for magnetic recording of data; and
   an underlayer provided between the substrate and the magnetic layer,
   wherein the underlayer is made of a non-magnetic metal element, has an irregular surface having bumps with a diameter of less than 100 nm, and has a mean thickness of 10 nm or less, and
   wherein crystal particles are formed on the surface of the underlayer.

5. The magnetic recording medium as set forth in claim 4, wherein the mean thickness of the underlayer is in a range from 2 nm to 10 nm.

6. The magnetic recording medium as set forth in claim 4, wherein the non-magnetic metal element is aluminum.

7. The magnetic recording medium as set forth in claim 4, wherein a magnetic compensation temperature is 25° C. or more.

8. A magnetic recording medium, comprising:
   a substrate;
   a magnetic layer for magnetic recording of data by applying heat and a magnetic field; and
   an underlayer provided between the substrate and the magnetic layer,
   wherein the underlayer is made of a non-magnetic metal element and is put together with the magnetic layer and has an irregular surface having bumps with a diameter of less than 100 nm, and
   wherein crystal particles are formed on the surface of the underlayer.

9. The magnetic recording medium as set forth in claim 8, wherein the non-magnetic metal element is aluminum.

10. The magnetic recording medium as set forth in claim 8, wherein a magnetic compensation temperature is 25° C. or more.

11. A magnetic recording medium, comprising:
    a substrate;
    a magnetic layer for magnetic recording of data by applying heat and a magnetic field; and
    an underlayer provided between the substrate and the magnetic layer,
    wherein the underlayer is made of a non-magnetic metal element, has an irregular surface having bumps with a diameter of less than 100 nm, and has a mean thickness of 10 nm or less and
    wherein crystal particles are formed on the surface of the underlayer.

12. The magnetic recording medium as set forth in claim 11, wherein the mean thickness of the underlayer is in a range from 2 nm to 10 nm.

13. The magnetic recording medium as set forth in claim 11, wherein the non-magnetic metal element is aluminum.

14. The magnetic recording medium as set forth in claim 11, wherein a magnetic compensation temperature is 25° C. or more.

15. A magnetic recording medium, comprising:
    a substrate;
    a magnetic layer for magnetic recording of data; and
    an underlayer provided between the substrate and the magnetic layer,
    wherein the underlayer is made of a non-magnetic metal element and has an irregular surface that faces to the magnetic layer, the irregular surface having bumps having a diameter of less than 100 nm, and
    wherein crystal particles are formed on the surface of the underlayer.

16. The magnetic recording medium as set forth in claim 15, wherein the non-magnetic metal element is aluminum.

17. The magnetic recording medium as set forth in claim 15, wherein a magnetic compensation temperature is 25° C. or more.

18. A magnetic recording apparatus for magnetically recording data onto a magnetic recording medium including (a) a substrate and (b) a magnetic layer for magnetic recording of data, the magnetic recording apparatus magnetically recording data onto the magnetic layer, and comprising:
    magnetic field applying means for applying a magnetic field on the magnetic layer, the magnetic field orientating magnetization of the magnetic layer,
    the magnetic recording medium further including an underlayer provided between the substrate and the magnetic layer,
    the magnetic layer being made of an amorphous magnetic material, and
    the underlayer being made of a non-magnetic metal element, having an irregular surface having bumps with a diameter of less than 100 nm, and being put together with the magnetic layer,
    wherein crystal particles are formed on the surface of the underlayer.

19. A magnetic recording apparatus for magnetically recording data onto a magnetic recording medium including (a) a substrate and (b) a magnetic layer for magnetic recording of data, the magnetic recording apparatus magnetically recording data onto the magnetic layer, and comprising:
    magnetic field applying means for applying a magnetic field on the magnetic layer, the magnetic field orientating magnetization of the magnetic layer,
    the magnetic recording medium further including an underlayer provided between the substrate and the magnetic layer,
    the magnetic layer being made of an amorphous magnetic material, and
    the underlayer being made of a non-magnetic metal element, having an irregular surface having bumps with a diameter of less than 100 nm, and having a mean thickness of 10 nm or less, wherein crystal particles are formed on the surface of the underlayer.

20. A magnetic recording apparatus for magnetically recording data onto a magnetic recording medium including (a) a substrate and (b) a magnetic layer for magnetic recording of data, the magnetic-recording apparatus magnetically recording data onto the magnetic layer, and comprising:

magnetic field applying means for applying a magnetic field on the magnetic layer, the magnetic field orientating magnetization of the magnetic layer, the magnetic recording medium further including an underlayer provided between the substrate and the magnetic layer, the magnetic layer being made of an amorphous magnetic material, the underlayer being made of a non-magnetic metal element, and having an irregular surface that faces to the magnetic layer, the irregular surface having bumps of a diameter of less than 100 nm, wherein crystal particles are formed on the surface of the underlayer.

21. A magnetic recording apparatus for magnetically recording data onto a magnetic recording medium including (a) a substrate and (b) a magnetic layer for magnetic recording of data, the magnetic recording apparatus magnetically recording data onto the magnetic layer, and comprising:

light beam radiating means for radiating a light beam locally onto a portion of the magnetic layer, the light beam locally heating the magnetic layer; and magnetic field applying means for applying a magnetic field on at least part of the portion of the magnetic layer on which the light beam is radiated, the magnetic field orientating magnetization of the magnetic layer, the magnetic recording medium further including an underlayer provided between the substrate and the magnetic layer, the magnetic layer being made of an amorphous magnetic material, and the underlayer being made of a non-magnetic metal element, having an irregular surface having bumps with a diameter of less than 100 nm, and being put together with the magnetic layer, wherein crystal particles are formed on the surface of the underlayer.

22. A magnetic recording apparatus for magnetically recording data onto a magnetic recording medium including (a) a substrate and (b) a magnetic layer for magnetic recording of data, the magnetic recording apparatus magnetically recording data onto the magnetic layer, and comprising:

light beam radiating means for radiating a light beam locally onto a portion of the magnetic layer, the light beam locally heating the magnetic layer; and magnetic field applying means for applying a magnetic field on at least part of the portion of the magnetic layer on which the light beam is radiated, the magnetic field orientating magnetization of the magnetic layer, the magnetic recording medium further including an underlayer provided between the substrate and the magnetic layer, the magnetic layer being made of an amorphous magnetic material, and the underlayer being made of a non-magnetic metal element, having an irregular surface having bumps with a diameter of less than 100 nm, and having a mean thickness of 10 nm or less, wherein crystal particles are formed on the surface of the underlayer.

23. A magnetic recording apparatus for magnetically recording data onto a magnetic recording medium including (a) a substrate and (b) a magnetic layer for magnetic recording of data, the magnetic recording apparatus magnetically recording data onto the magnetic layer, and comprising:

light beam radiating means for radiating a light beam locally onto a portion of the magnetic layer, the light beam locally heating the magnetic layer; and magnetic field applying means for applying a magnetic field on at least part of the portion of the magnetic layer on which the light beam is radiated, the magnetic field orientating magnetization of the magnetic layer, the magnetic recording medium further including an underlayer provided between the substrate and the magnetic layer, the magnetic layer being made of an amorphous magnetic material, the underlayer being made of a non-magnetic metal element, and having an irregular surface that faces to the magnetic layer, the irregular surface having bumps of a diameter of less than 100 nm, wherein crystal particles are formed on the surface of the underlayer.

\* \* \* \* \*